(12) United States Patent
Marcouiller et al.

(10) Patent No.: US 10,871,620 B2
(45) Date of Patent: Dec. 22, 2020

(54) CABLE SLACK STORAGE SYSTEM FOR TERMINAL

(71) Applicant: COMMSCOPE TECHNOLOGIES LLC, Hickory, NC (US)

(72) Inventors: Thomas Marcouiller, Shakopee, MN (US); Oscar Fernando Bran De León, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 33 days.

(21) Appl. No.: 16/076,649

(22) PCT Filed: Feb. 8, 2017

(86) PCT No.: PCT/US2017/016983
§ 371 (c)(1),
(2) Date: Aug. 8, 2018

(87) PCT Pub. No.: WO2017/139358
PCT Pub. Date: Aug. 17, 2017

(65) Prior Publication Data
US 2019/0041597 A1   Feb. 7, 2019

Related U.S. Application Data

(60) Provisional application No. 62/292,590, filed on Feb. 8, 2016, provisional application No. 62/314,699, filed on Mar. 29, 2016.

(51) Int. Cl.
*G02B 6/44* (2006.01)
*G02B 6/48* (2006.01)

(52) U.S. Cl.
CPC ......... *G02B 6/4457* (2013.01); *G02B 6/4441* (2013.01); *G02B 6/4475* (2013.01); *G02B 6/4478* (2013.01); *G02B 6/48* (2013.01)

(58) Field of Classification Search
CPC ... G02B 6/4478; G02B 6/4441; G02B 6/4457
See application file for complete search history.

(56) References Cited

U.S. PATENT DOCUMENTS 2,952,420 A    9/1960  Von Hoorn
5,724,469 A *  3/1998  Orlando ................. G02B 6/444
                                                        385/135

(Continued)

FOREIGN PATENT DOCUMENTS

EP    1 944 886 A1    7/2008
WO    2008/137894 A1  11/2008
WO    2017/139396 A1  8/2017

OTHER PUBLICATIONS

International Search Report and Written Opinion of the International Searching Authority for International Patent Application No. PCT/US2017/016983 dated Apr. 25, 2017, 17 pages.

(Continued)

*Primary Examiner* — Charlie Y Peng
(74) *Attorney, Agent, or Firm* — Merchant & Gould P.C.

(57) ABSTRACT

A slack storage bracket is configured to mount at an installation site. The slack storage bracket includes a slack storage structure configured to receive excess length of a cable. The slack storage bracket also includes a terminal mounting structure forward of the slack storage structure. A terminal can be mounted to the terminal mounting structure of the slack storage bracket, directly, with a terminal mounting bracket, and/or with a terminal adapter. The slack length can be managed within a slack management spool, which can be mounted at the slack storage structure.

20 Claims, 31 Drawing Sheets

(56) References Cited

U.S. PATENT DOCUMENTS

| | | | |
|---|---|---|---|
| 5,908,172 A | 6/1999 | Pierro et al. | |
| 5,992,787 A | 11/1999 | Burke | |
| 6,234,418 B1 | 5/2001 | Donaldson | |
| 7,220,144 B1 | 5/2007 | Elliot et al. | |
| 7,250,570 B1 * | 7/2007 | Morand | F24D 3/141 |
| | | | 174/37 |
| 7,264,402 B2 | 9/2007 | Theuerkorn et al. | |
| 7,346,253 B2 * | 3/2008 | Bloodworth | G02B 6/4453 |
| | | | 385/134 |
| 7,397,997 B2 | 7/2008 | Mertesdorf et al. | |
| 7,444,056 B2 | 10/2008 | Allen et al. | |
| 7,477,824 B2 | 1/2009 | Reagan et al. | |
| 7,512,304 B2 | 3/2009 | Gronvall et al. | |
| 7,558,458 B2 | 7/2009 | Gronvall et al. | |
| 7,591,595 B2 | 9/2009 | Lu et al. | |
| 7,654,484 B2 | 2/2010 | Mogensen et al. | |
| 7,720,343 B2 | 5/2010 | Barth et al. | |
| 7,744,286 B2 | 6/2010 | Lu et al. | |
| 7,744,288 B2 | 6/2010 | Lu et al. | |
| 7,762,726 B2 | 7/2010 | Lu et al. | |
| 7,844,158 B2 | 11/2010 | Gronvall et al. | |
| 7,869,682 B2 * | 1/2011 | Kowalczyk | G02B 6/4441 |
| | | | 385/135 |
| 7,942,590 B2 | 5/2011 | Lu et al. | |
| 7,959,361 B2 | 6/2011 | Lu et al. | |
| 8,218,935 B2 | 7/2012 | Reagan et al. | |
| 8,230,995 B2 | 7/2012 | Andrews et al. | |
| 8,254,740 B2 | 8/2012 | Smith et al. | |
| D667,390 S | 9/2012 | Matera | |
| 8,565,572 B2 | 10/2013 | Krampotich et al. | |
| 8,805,152 B2 | 8/2014 | Smith et al. | |
| 9,042,700 B2 | 5/2015 | Smith et al. | |
| 9,097,870 B2 | 8/2015 | Torman et al. | |
| 9,348,096 B2 * | 5/2016 | Kmit | H04Q 11/0067 |
| 9,377,599 B2 | 6/2016 | Smith et al. | |
| 9,459,424 B2 | 10/2016 | Smith et al. | |
| D774,877 S | 12/2016 | Gonzalez et al. | |
| 9,541,727 B2 | 1/2017 | Torman et al. | |
| 9,555,999 B2 | 1/2017 | Smith et al. | |
| 9,632,273 B2 | 4/2017 | Smith et al. | |
| 2003/0122023 A1 | 7/2003 | Pitcher | |
| 2005/0145522 A1 | 7/2005 | Bloodworth et al. | |
| 2008/0230643 A1 | 9/2008 | Ornskar | |
| 2009/0208177 A1 | 8/2009 | Smith | |
| 2009/0317047 A1 | 12/2009 | Smith et al. | |
| 2010/0247051 A1 | 9/2010 | Kowalczyk et al. | |
| 2010/0310224 A1 | 12/2010 | Kowalczyk et al. | |
| 2010/0329620 A1 * | 12/2010 | Griffiths | G02B 6/4442 |
| | | | 385/135 |
| 2011/0259991 A1 | 10/2011 | Goldstein et al. | |
| 2011/0262146 A1 | 10/2011 | Khemakhem et al. | |
| 2011/0293235 A1 * | 12/2011 | Nieves | G02B 6/4446 |
| | | | 385/135 |
| 2012/0063735 A1 * | 3/2012 | Nair | G02B 6/4446 |
| | | | 385/135 |
| 2013/0075522 A1 | 3/2013 | Penumatcha | |
| 2013/0170811 A1 | 7/2013 | Kowalczyk et al. | |
| 2013/0195417 A1 * | 8/2013 | Torman | G02B 6/4471 |
| | | | 385/135 |
| 2014/0003782 A1 | 1/2014 | Blackwell, Jr. et al. | |
| 2014/0334791 A1 | 11/2014 | Smith et al. | |
| 2015/0241653 A1 | 8/2015 | Krampotich | |
| 2015/0355428 A1 * | 12/2015 | Leeman | G02B 6/4452 |
| | | | 385/135 |
| 2016/0097907 A1 * | 4/2016 | Hill | G02B 6/4442 |
| | | | 385/135 |
| 2017/0227729 A1 | 8/2017 | Marcouiller et al. | |

OTHER PUBLICATIONS

Macaroon Cord Winder with Earbud, 2 pages, downloaded Sep. 16, 2016, http:www.swedausa/com/main/default/Products/Detail.aspx?id=1002.

Klein Tools, ⅛in. High Strength Wide Steel Fish Tape—25 ft, 2 pages, downloaded Sep. 16, 2016, http:wwww.homedepot.com/p/Klein-Tools-1-8-in-High-Strength-Wide-Steel-Fish-Tape-25-ft-56000.

Extended European Search Report for corresponding European Patent Application No. 17750681.3 dated Jul. 2, 2019, 9 pages.

\* cited by examiner

… (1,2)

CABLE SLACK STORAGE SYSTEM FOR TERMINAL

CROSS-REFERENCE TO RELATED APPLICATIONS

This application is a National Stage Application of PCT/US2017/016983, filed on Feb. 8, 2017, which claims the benefit of U.S. Patent Application Ser. No. 62/292,590, filed on Feb. 8, 2016, and claims the benefit of U.S. Patent Application Ser. No. 62/314,699, filed on Mar. 29, 2016, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivery high-speed communications data because they may not employ active electronic devices, such as amplifiers and repeaters, between a central office and a subscriber termination. The absence of electronic devices may decrease network complexity and/or cost and may increase network reliability.

As demand for telecommunications increases, fiber optic networks are being extended in more and more areas. Cables are also used to interconnect various network components (e.g., fiber distribution hubs, indexing terminals, multiservice terminals, subscriber terminations, etc.). The length of cable needed between network components varies depending upon location. However, because of the variability in location of the network components, it is difficult to estimate exactly how much fiber optic cable will be necessary to span the distance from endpoint to endpoint. As a result, there is a need to effectively manage varying lengths of cable within a network. Often, the length of fiber optic cable used can far exceed the actual distance requirements leaving small to significant amounts of slack fiber optic cable at the network component that must be dealt with by the installer. Accordingly, there is also a need for techniques to effectively managing excess cable length while also taking into consideration space constraints.

SUMMARY

The present disclose is directed to a slack storage bracket that can be mounted at an installation site in conjunction with a terminal, thereby presenting a single, compact assembly that can neatly and easily store slack fiber optic cable.

Some aspects of the disclosure are directed a slack storage system including a slack storage bracket having a front and a rear. The rear defines a mounting surface configured to mount at an installation site. The slack storage bracket includes a slack storage structure extending forwardly of the mounting surface. The slack storage structure includes a wall framework having no less than a minimum fiber bend radius of a cable to be stored at the slack storage structure. The slack storage bracket also includes a terminal mounting structure forward of the slack storage structure.

In certain implementations, the terminal mounting structure includes first and second sleeve arrangements that each define a channel between opposing walls. Each sleeve arrangement also includes a protruding portion that extends into the respective channel.

In certain implementations, a terminal is configured to mount to the terminal mounting structure.

In certain implementations, the terminal includes laterally extending rails sized to fit within the channels defined by the sleeve arrangements. Each rail defines an opening sized and shaped to receive the protruding portion of a respective one of the sleeve arrangements.

In certain implementations, a terminal mounting bracket includes laterally extending rails sized to fit within the channels defined by the sleeve arrangements. Each rail defines an opening sized and shaped to receive the protruding portion of a respective one of the sleeve arrangements. The terminal mounting bracket also is configured to hold the terminal.

In certain implementations, a terminal adapter is configured to hold the terminal so that the terminal moves unitarily with the terminal adapter; and a terminal mounting bracket including mounting structure configured to couple the terminal adapter to the terminal mounting bracket. The terminal mounting bracket includes laterally extending rails sized to fit within the channels defined by the sleeve arrangements. Each rail defines an opening sized and shaped to receive the protruding portion of a respective one of the sleeve arrangements.

In certain implementations, the installation site comprises one of a pole, a pedestal, a hand-hole, or an aerial strand.

In certain implementations, the slack storage bracket includes an arcuate back portion to accommodate the installation site.

In certain implementations, the slack storage bracket defines elongated slots through which straps can loop to secure the slack storage bracket to the installation site.

In certain implementations, the slack storage bracket includes tabs extending outwardly from a perimeter of the slack storage structure.

In certain implementations, at least one of the opposing walls of each sleeve arrangement is flexible relative to the other of the opposing walls.

In certain implementations, a slack management spool configured to hold excess cable slack. The slack management spool is configured to mount to the slack storage structure of the slack storage bracket.

In certain implementations, the terminal includes an indexing terminal.

In certain implementations, the terminal includes a multi-service terminal.

Other aspects of the disclosure are directed a packaging and deployment system including: a cable having a first axial end and an opposite second axial end; a disposable spool about which a majority of the cable is wound; a terminal mounting bracket coupled to the disposable spool; a terminal adapter configured to couple to the terminal mounting bracket; and a terminal coupled to the second axial end of the cable. The disposable spool is configured to payout the cable when the first axial end is pulled relative to the disposable spool. The terminal mounting bracket includes rails each defining at least one opening. The terminal is coupled to the second axial end of the cable, the terminal being mounted to the terminal adapter.

In certain implementations, the terminal adapter is mounted directly to the disposable spool.

In certain implementations, the terminal adapter is mounted directly to the terminal mounting bracket.

Other aspects of the disclosure are directed a packaging and deployment system including: a cable having a first axial end and an opposite second axial end; a disposable spool about which a majority of the cable is wound; a slack management spool attached to the disposable spool; a terminal mounting bracket coupled to the disposable spool; and a terminal coupled to the second axial end of the cable. The disposable spool is configured to payout the cable when the first axial end is pulled relative to the disposable spool. The slack management spool includes flexible flanges that cooperate to define a slot that is narrower than a width of the cable. The terminal mounting bracket includes rails each defining at least one opening.

In certain implementations, the terminal is mounted directly to the terminal mounting bracket.

In certain implementations, the terminal mounting bracket is mounted to the slack management spool.

In certain implementations, the terminal mounting bracket is mounted to the disposable spool.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
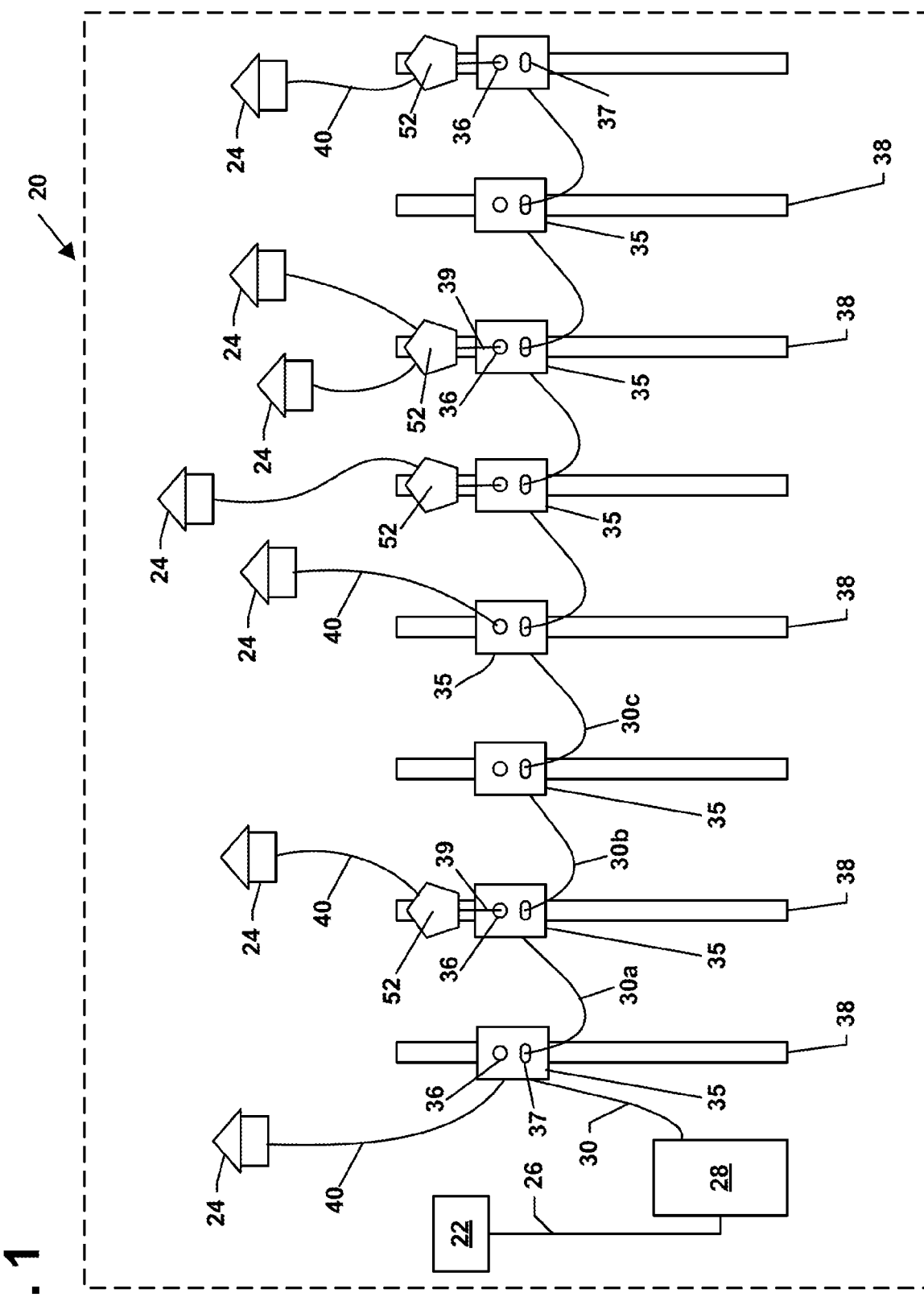
FIG. 1 is a schematic representation of an example fiber optic network including indexing terminals.

Referring now to FIG. 1, a passive fiber optic distribution network 20 deploying passive fiber optic lines is shown. Generally, the fiber optic distribution network 20 is adapted for transmitting fiber optic signals between a central office 22 and a number of end subscribers 24. The central office 22 can additionally connect to a larger network such as the Internet (not shown) and a public switched telephone network (PSTN). The various lines of the network 20 can be aerial or housed within underground conduits.

The example optical network 20 includes at least one fiber distribution hub 28 optically coupled to the central office 22. At least one feeder cable 26 extends from the central office 22 to each distribution hub 28. At the distribution hub 28, optical signals carried by the feeder cable 26 can be power split onto optical fibers of one or more distribution cables 30. For example, the fiber distribution hubs 28 can have one or more optical splitters (e.g., 1-to-8 splitters, 1-to-16 splitters, or 1-to-32 splitters) that generate a number of individual fibers that may lead to the premises of an end user 24. In addition or alternatively, the optical signals can be filtered (e.g., by one or more wave division multiplexers) at the distribution hub 28 onto the one or more distribution cables 30. An example fiber distribution hub has been described in U.S. Pat. No. 7,720,343, which is hereby incorporated by reference in its entirety. While only a single hub 28 is shown in FIG. 1, it will be understood that optical networks 20 typically include multiple hubs. At least one distribution cable 30 extends from the distribution hub 28 towards subscriber premises 24.

In accordance with some aspects, the optical network 20 is a distributed optical network in which optical signals may be split at a splitting location disposed between the distribution hub 28 and the individual subscriber premises 24 as will be disclosed in more detail herein. In such systems, individual optical fibers may be broken out from the distribution cable(s) 30 at geographic intervals and routed to the splitting locations. In various implementations, the splitting locations may be positioned at telephone poles, strands, and/or hand holes. From the splitting locations, the split optical signals are carried by drop cables 40 to the individual subscriber premises 24.

In some implementations, the individual optical fibers are broken out from the distribution cable 30 at indexing terminals 35. Each indexing terminal 35 receives a distribution cable 30 having one or more optical fibers. In some implementations, the distribution cable 30 is a stub cable that extends outwardly from the indexing terminal 35. In other implementations, the indexing terminal 35 receives a connectorized end of the distribution cable 30. In the example shown in FIG. 1, a first distribution cable 30 is routed between the distribution hub 28 and a mounting structure (e.g., telephone pole) 38 at which an indexing terminal 35 is mounted. Alternatively, the indexing terminal 35 could be mounted within a handhole, hung from a utility line, or otherwise installed in the field.

The indexing terminal 35 has an input, at least one first output port 36, and at least one second output port 37. As noted above, one example input is an input port. Another example input is a free end of a stub input cable. A second distribution cable 30 extends from the indexing terminal 35 at the first mounting structure 38 to another indexing terminal 35 mounted at a second mounting structure 38 as will be described in more detail herein. In the distributed network 20 shown in FIG. 1, the indexing terminals 35 are mounted to utility poles 38. These indexing terminals 35 can be daisy-chained together using distribution cables 30.

When multiple indexing terminals 35 are daisy-chained together to form a route between the first and last indexing terminals 35 in the chain, fiber lines from the hub 28 are progressively dropped from the route and the fiber lines are progressively indexed along the route as will be described in more detail herein. Each fiber line includes one or more optical fibers optically coupled together (e.g., using connectors, splitters, WDMs, etc.) to extend along the route. The indexing terminals 35 along the route will follow a predetermined schema so that each fiber line is dropped when it reaches a predetermined sequential fiber position (described in more detail herein) at the indexing terminal 35. Each dropped fiber line is routed from the drop location towards at least one of the subscribers 24.

Subscribers 24 can be coupled to the optical network 20 via the indexing terminals 35. In some implementations, the drop cables 40 can be plugged into an indexing terminal 35 to carry the separated optical signals of the dropped fiber line from the indexing terminal 35 to the subscribers 24. In certain implementations, an indexing terminal 35 can include one or more power splitters or wave division multiplexers to split or filter the optical signals received at the input of the indexing terminal 35. The split or filtered optical signals can be carried by the dropped line. The split or filtered optical signals can be carried by the indexed lines.

In other implementations, one or more multi-service terminals 52 may be mounted at or near the indexing terminals 35. A cable 39 optically couples one of the multi-service terminals 52 to one of the indexing terminals 35. In some implementations, the cable 39 is a stub cable that extends from the multi-service terminal 52. For example, a connectorized end of the stub cable 39 may be plugged into an output port of the indexing terminal 35 so that optical signals are routed to the optical splitters and/or wave division multiplexers. In other implementations, the cable 39 is connectorized at both ends and plugs into the indexing terminal 35 and into an input port of the multi-service terminal 35. In still other implementations, the cable 39 is a stub cable extending from the indexing terminal 35 that couples to an input port of the multi-service terminal 52. In such an example, the stub cable would define the first output port 36 of the indexing terminal 35.

The multi-service terminals 52 do not index the optical fiber lines. Certain types of multi-service terminal 52 include one or more optical power splitters and/or wave division multiplexers (WDMs). Pigtails carry optical signals between the splitters/WDMs and distribution ports of the multi-service terminal 52. Drop cables 40 may be plugged into the distribution ports of the multi-service terminals 52 to optically couple to the pigtails. Accordingly, the drop cables 40 carry signals split or filtered onto the pigtails to the subscriber premises 24.

Figure 2:
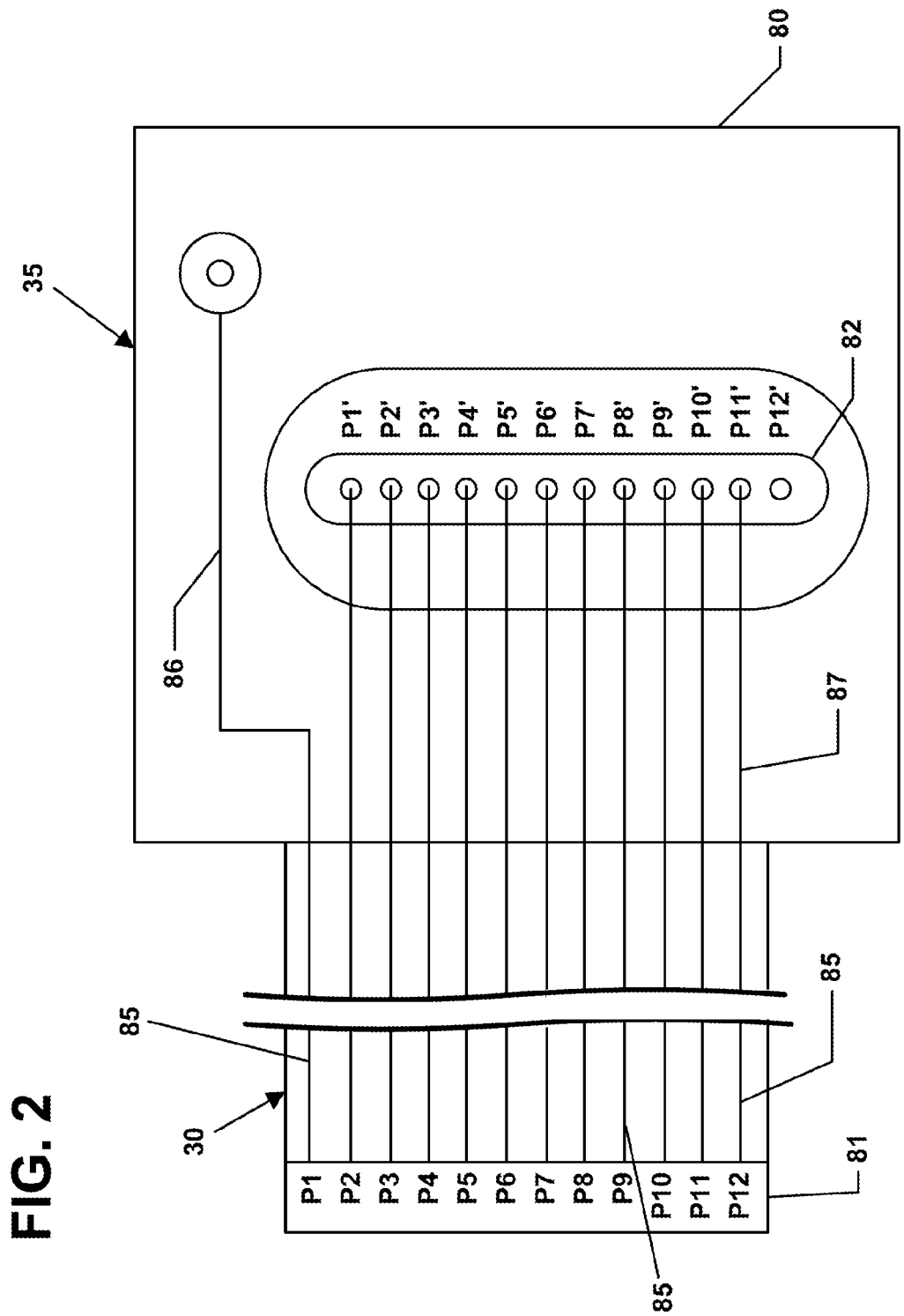
FIG. 2 is a schematic representation of an example indexing terminal suitable for use in the network of FIG. 1.

FIG. 2 illustrates an example indexing terminal 35 suitable for use in the distributed optical network 20 of FIG. 1. Each indexing terminal 35 separates one or more of the optical fiber lines (see 406) from the remaining optical fiber lines (see 407) to form a drop location. This separation of the optical fibers 406 causes the respective fiber lines to drop from the route at the drop location. The indexing terminal indexes the remaining optical fiber lines.

The indexing terminal 35 includes a housing 80 that defines an input, at least one first output port 36, and at least one second output port 37. In the example shown, a stub distribution cable extends outwardly from the indexing terminal housing 80 and terminates at a connector (e.g., an MPO connector) 81, which forms the input of the indexing terminal 35. In other examples, however, the connector 81 could be disposed within the housing 80 at an interior end of an input port, which is configured to align the connector 81 with a connectorized end of a distribution cable 30.

First ends of multiple optical fibers 85 terminate at the connector 81. The connector 81 arranges the first ends of the multiple optical fibers 85 in sequential fiber positions P1-P12. FIG. 2 is a schematic diagram showing the sequential fiber positions P1-P12 extending in a single row. However, it will be understood that different types of connectors 81 will have different configurations of sequential fiber positions (e.g., multiple rows, staggered, etc.) and different numbers of fiber positions (e.g., two, four, eight, twenty-four, ninety-six, etc.). In addition, it will be understood that the sequential positions need not be consecutive positions. For example, a first fiber position P1 can be located at an opposite end of the connector 81 from a second fiber position P2. Rather, the indexing terminals 35 along the route will follow a predetermined schema including a common sequence of fiber positions in multi-fiber connectors (or equivalent components) along the route.

One or more of the optical fibers 85 are separated out (see 86) from a remainder (see 87) of the optical fibers 85 within the indexing terminal housing 80. At least one of the separated fibers 86 always extends from the first sequential fiber position at the connector 81. In some example schema, only the fiber at the first sequential fiber position P1 is separated out. In other example schema, fibers at the first and second sequential fiber positions P1, P2 can be separated out. In still other example schema, additional fibers received at subsequent sequential fiber positions (e.g., P3, P4, etc.) can also be separated out. In certain implementations, the fiber positions from which fibers are separated out are consistent in all indexing terminals 35 configured according to the same schema.

The separated fibers 86 are routed to the one or more first output ports 36 of the indexing terminal 35. The separated optical fibers 86 carry optical signals, which were received at an input of the indexing terminal 35, to the one or more first output ports 37 of the indexing terminal 35. In some implementations, each separated fiber 86 is routed to a unique first output port 36. In other implementations, multiple separated fibers 86 could be routed to the same first output port 36.

All of the optical fibers 87 of the remainder of optical fibers 85 are routed to the one or more second output ports 37 of the indexing terminal housing 35. Accordingly, the indexing terminal 35 carries the remaining optical signals received at the input of the indexing terminal 35 to the one or more second output ports 37 of the indexing terminal 35. In certain implementations, each indexing terminal 35 has only one second output port 37. Each indexing terminal 35 indexes the remaining optical fibers 87 at the one or more second output ports 37.

In certain implementations, the second output port 37 has an interior end receiving a multi-fiber connector 82, which arranges the second ends of the remaining fibers 87 in sequential fiber positions P1'-P12'. In other implementations, the multi-fiber connector 82 can terminate a stub cable extending outwardly from the indexing terminal 35. In such implementations, the multi-fiber connector 82 forms the second output port 37. The remaining optical fibers 87 are indexed along the sequential fiber positions of the multi-fiber connector 82 so that at least one optical fiber is received at the sequential fiber positions P1' . . . at the second port 37.

Since the indexing terminals 35 along the route follow the predetermined schema, the sequential fiber positions P1'-P12' of the multi-fiber connector 82 in each indexing terminal 35 will match the sequential fiber positions P1-P12 of the multi-fiber connector 81 in the respective subsequent indexing terminal 35. Accordingly, routing an optical fiber to the first sequential fiber position P1' at the multi-fiber connector 82 guarantees that the respective fiber line will extend to the first sequential fiber position P1 at the input of the subsequent indexing terminal 35 when the indexing terminal 35 and the subsequent indexing terminal 35 are daisy-chained together. Therefore, separating out the optical fiber received at the first sequential position P1 of the subsequent indexing terminal 35 provides optical signals to the first output port 36 of the subsequent indexing terminal 35.

As the term is used herein, "indexing" refers to routing the optical fibers in such a way that an optical fiber is received at each sequential fiber position at the second port 37 of an indexing terminal 35 that matches the sequential fiber position P1-P12 of a multi-fiber connector 81 in a subsequent indexing terminal 35 from which an optical fiber 86 will be separated out in the subsequent indexing terminal 35. Accordingly, the multi-fiber connector 82 does not receive a remaining optical fiber 87 from the connector 81 at the last sequential fiber position P12'.

In some implementations, the connectors 81, 82 are configured to interface with ruggedized multi-fiber connectors. As the terms are used herein, "ruggedized connectors" and "ruggedized adapters" are configured to mate together to form an environmental seal. Ruggedized connectors and/or ruggedized adapters also can include fasteners (e.g., threaded fasteners, bayonet-style fasteners, etc.) for providing robust connector-to connector mechanical connections. Ruggedized connectors can be male connectors or female connectors. Ruggedized adapters can be located on housings, cables, or other structures. Ruggedized connectors can include multi-fiber ferrules including fiber receiving arrangements defining a plurality of fiber receiving positions. In certain examples, the fiber receiving positions can be arranged in one or more rows of sequential fiber positions. Some non-limiting example ruggedized optical connector interfaces suitable for use with an indexing terminal 35 are disclosed in U.S. Pat. Nos. 7,264,402, 7,744,288, 7,762,726, 7,744,286, 7,942,590, and 7,959,361, the disclosures of which are hereby incorporated herein by reference.

In still other implementations of the network 20, the drop cables 40 connect subscribers 24 to multi-service terminals 52, which receive optical signals from fiber distribution hubs 28 or other network nodes without intervening indexing terminals 35.

Figure 3:
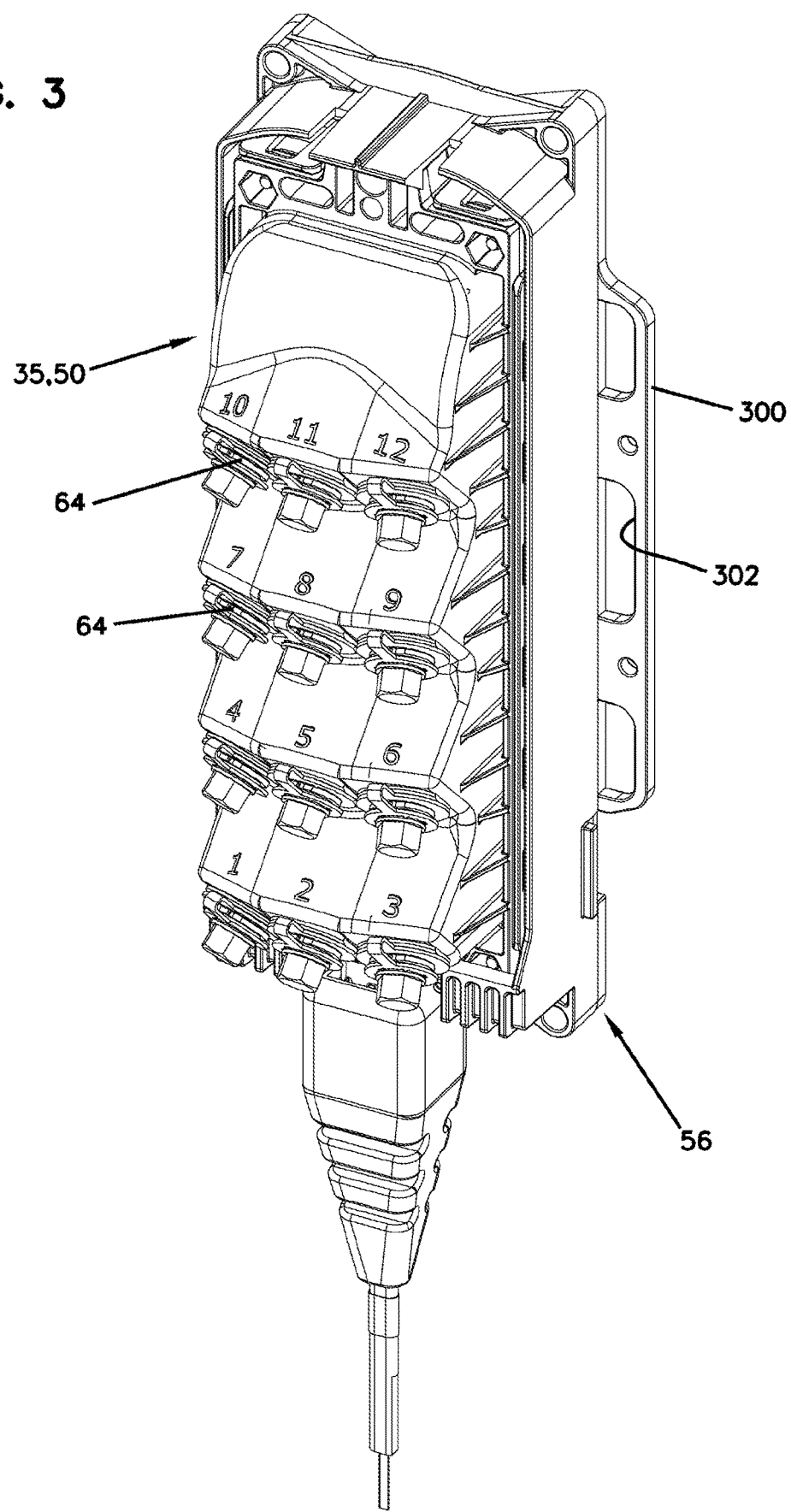
FIG. 3 is a perspective view of an example terminal mounted to an example terminal mounting bracket.

FIG. 3 illustrates an example multi-service terminal 52. As shown, the multi-service terminal 52 generally includes a housing 60 defining an input 62 and a plurality of outputs 64. In the example shown, the input 62 includes a port having an exterior side at which a connectorized end of a cable can be received. In other examples, the input 62 can be defined by a stub cable. In still other examples, the input 62 can be defined by an opening through which a cable extends into the housing 60. In the example shown, the outputs 64 include one or more ruggedized adapters having exterior ports at which ruggedized connectors can be received. In certain examples, the housing 60 environmentally seals components (e.g., fibers, passive optical splitters, wave division multiplexers, etc.) disposed within the housing 60.

Additional details regarding examples of suitable multi-service terminals can be found in U.S. Pat. Nos. 7,444,056, 7,591,595, and 7,844,158; and in U.S. Publication No. 2009/0208177, the disclosures of which are hereby incorporated herein by reference. It will be understood however, that the scope of the present disclosure is not limited to the adapters 70 or multi-service terminals 52 shown. The adapters can be any type of adapters (e.g., SC, angled SC, dual SC, LC, dual LC, etc.). The multi-service terminals can be any type of multi-service terminals (e.g., drop terminal, mini drop terminal, 4×3 drop terminal, etc.), with any number of ports (e.g., 4-port, 6-port, 8-port, 12-port, etc.).

Figure 4:
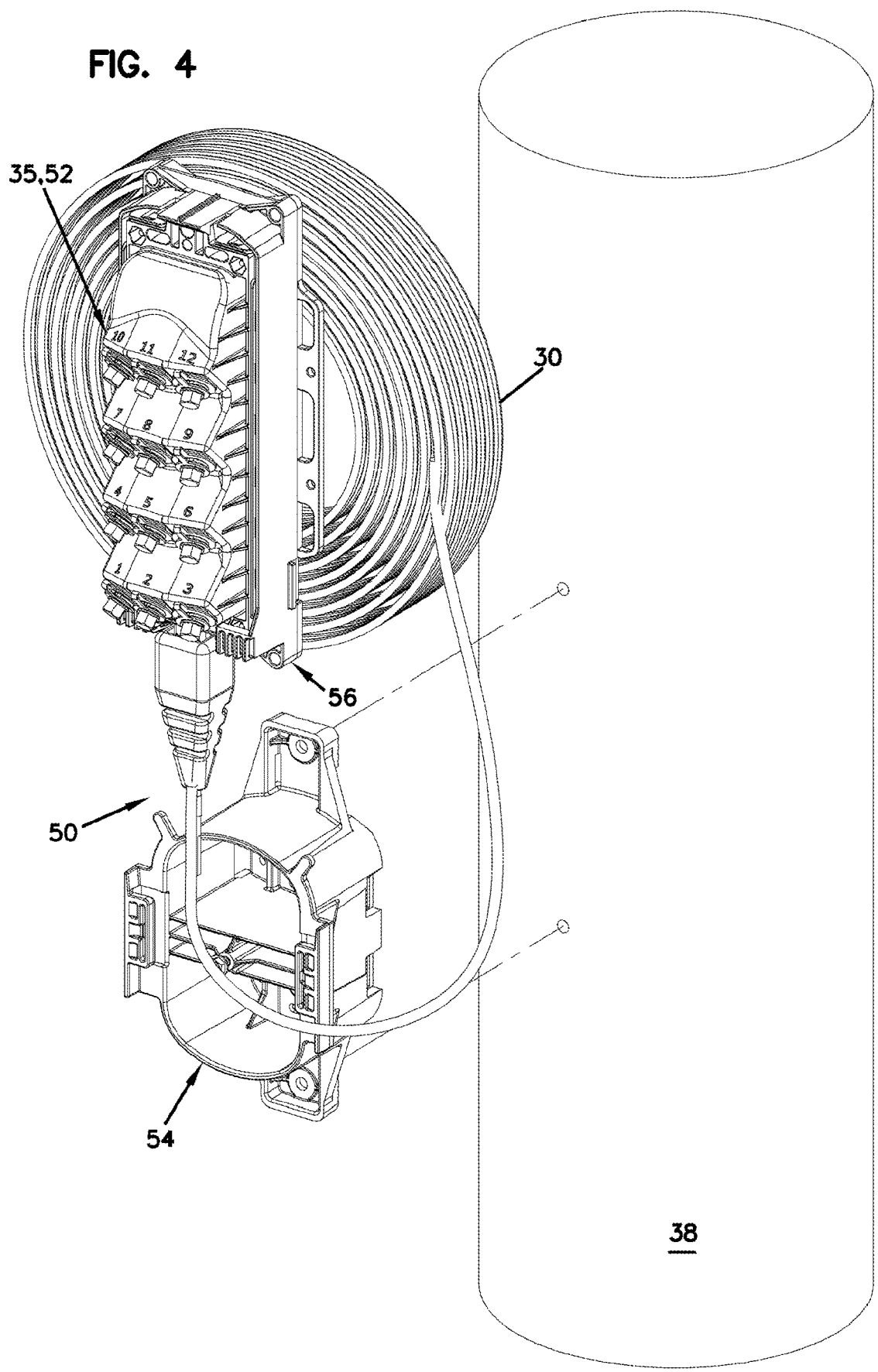
FIG. 4 illustrates an example slack storage bracket, terminal, terminal mounting bracket, and slack length of cable exploded away from an installation site.

In accordance with some aspects of the disclosure, slack storage is needed for cables extending between components in the network (e.g., for a distribution cable 30 connecting two indexing terminals 35, for a distribution cable 30 connecting a fiber distribution hub and a multi-service terminal 52, etc.). FIG. 4 illustrates an example slack storage assembly 50 suitable to store slack cable length between components. The slack storage assembly 50 generally includes a slack storage bracket 54 configured to hold both slack length of an optical cable (e.g., distribution cable 30) and a terminal (e.g., an indexing terminal 35, a multi-service terminal 52, etc.). An optional terminal mounting bracket 56 also may also be included in the slack storage assembly 50.

Figure 5:
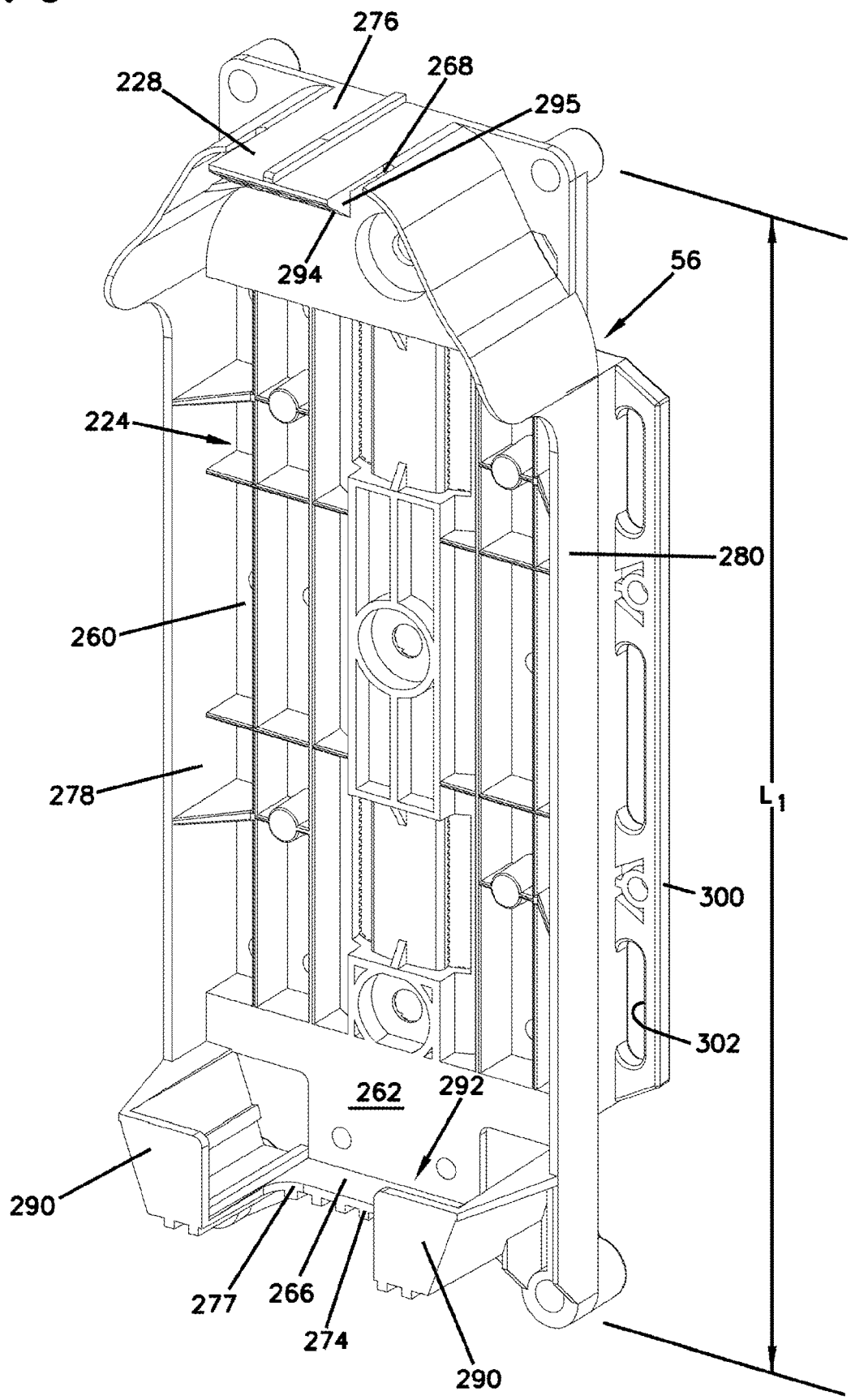
FIG. 5 is a front perspective view of an example terminal mounting bracket suitable for use with the terminal of FIG. 3.

FIG. 5 illustrates an example terminal mounting bracket 56 that mounts a terminal 35, 52 to the bracket 54. The terminal mounting bracket 56 includes rails 300 that extend outwardly from a base. The rails 300 define one or more openings 302. In certain examples, the rails 300 define elongated openings 302. The terminal 35, 52 attaches to the terminal mounting bracket 56 so that the rails 300 move unitarily with the terminal 35, 52. The rails 300 and openings 302 engage structure on the bracket 54 as will be described in more detail herein. In the example shown, the terminal mounting bracket 56 is depicted as having a one-piece construction.

Figure 6:
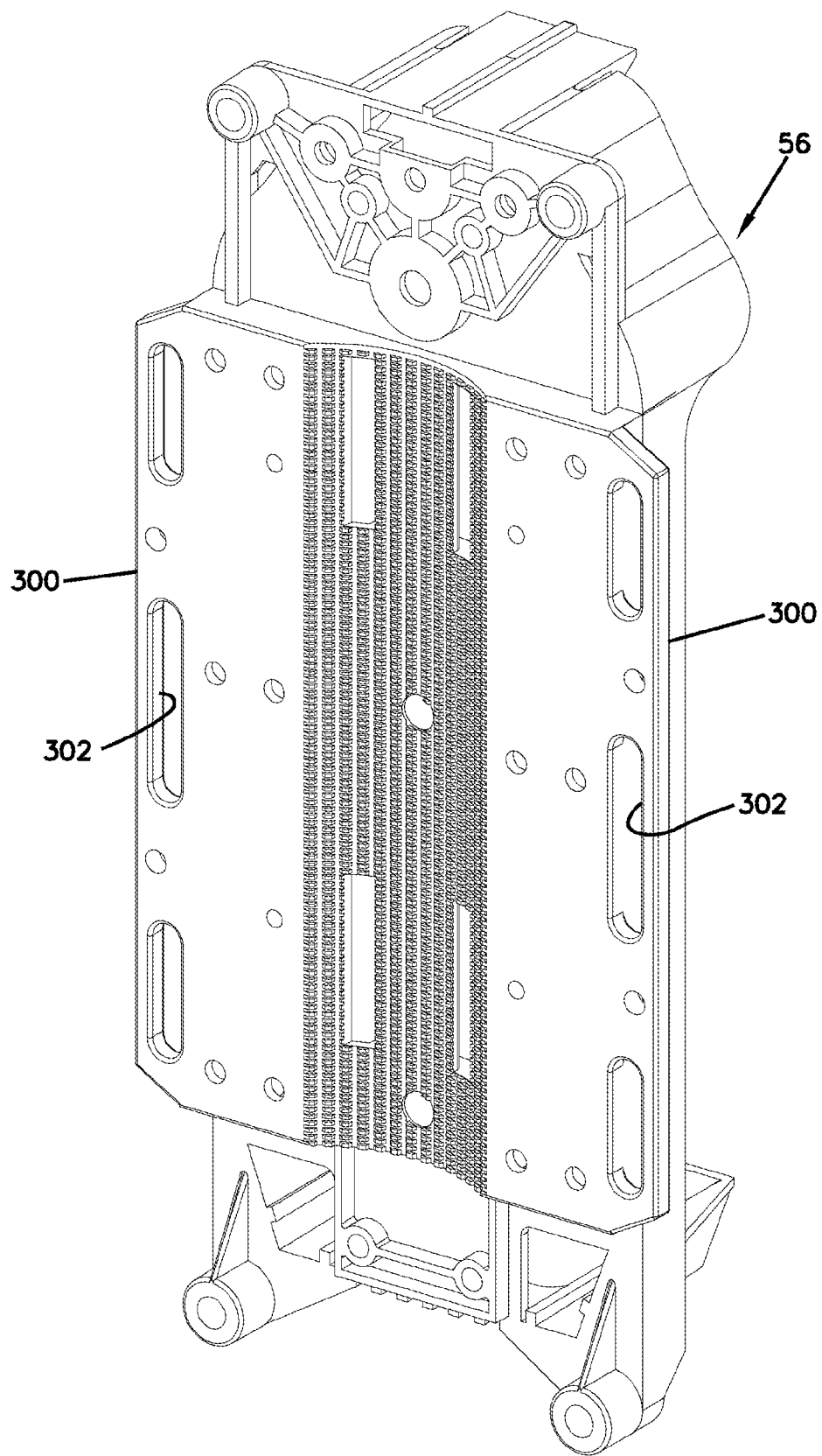
FIG. 6 is a rear perspective view of an example terminal mounting bracket suitable for use with the terminal of FIG. 3.

The terminal mounting bracket 56 includes a base portion 260 having a front side 262 (see FIG. 5) and a back side 264 (see FIG. 6). The base portion 260 is elongated along a length L1 that extends between a first end 266 and a second end 268. The terminal mounting bracket 56 includes structure defining a cradle 224. For example, the bracket 56 includes a first end wall 274 and a second end wall 276, The first end wall 274 projects outwardly from the front side 262 of the base portion 260 adjacent the first end 266 of the base portion 260. The second end wall 276 projects outwardly from the front side 262 of the base portion 260 adjacent the second end 268 of the base portion 260. The terminal mounting bracket 56 further includes side walls 278, 280 that project outwardly from the front side 262 of the base portion 260. As shown in FIG. 5, the side walls 278, 280 have heights that are less than the heights of the end walls 274, 276.

The end walls 274, 276 and the side walls 278, 280 cooperate to define a wall structure of the cradle 224 that is sized and shaped to receive the terminal 35, 52. In the depicted embodiments, the end walls 274, 276 and the side walls 278, 280 cooperate to extend around a majority of the periphery of the terminal 35, 52. The first end wall 274 includes a notched region 277 that provides clearance for the distribution cable 30 routed to the terminal 35, 52.

The terminal mounting bracket 56 further includes structure for securing/retaining the terminal 35, 52 within the cradle 224. For example, the terminal mounting bracket 56 includes retention tabs 290 that cooperate with the first end wall 274 to define a pocket 292 adapted to receive a first end of the terminal 35, 52. Additionally, a flexible latch 228 of the terminal mounting bracket 56 is mounted at the second end 268 of the base portion 260. The latch 228 has a cantilevered configuration. A ramp surface 294 is positioned adjacent the free end of the latch 228. A retention shoulder 295 is positioned adjacent the ramp surface 294.

To mount the terminal 35, 52 in the cradle 224, a first end of the terminal 35, 52 is inserted into the pocket 292. Then, the terminal 35, 52 is pivoted toward the terminal mounting bracket 56. As the terminal 35, 52 is pivoted toward the terminal mounting bracket 56, an opposite second end of the terminal 35, 52 engages the ramp surface 294 of the latch 228, thereby causing the latch 228 to flex outwardly. The latch 228 continues to flex outwardly until the second end of the terminal passes the retention shoulder 295 of the latch 228. When the second end passes by the retention shoulder 295 of the latch 228, the latch 228 snaps back to a locking position in which the retention shoulder 295 overlaps the second end of the terminal 35, 52 to lock the terminal 35, 52 in place. Once mounted within the cradle 224, the retention shoulder of the latch 228 and the retention tabs 290 of the pocket 292 prevent the terminal 35, 52 from being unintentionally disconnected from the terminal mounting bracket 56.

Figure 34:
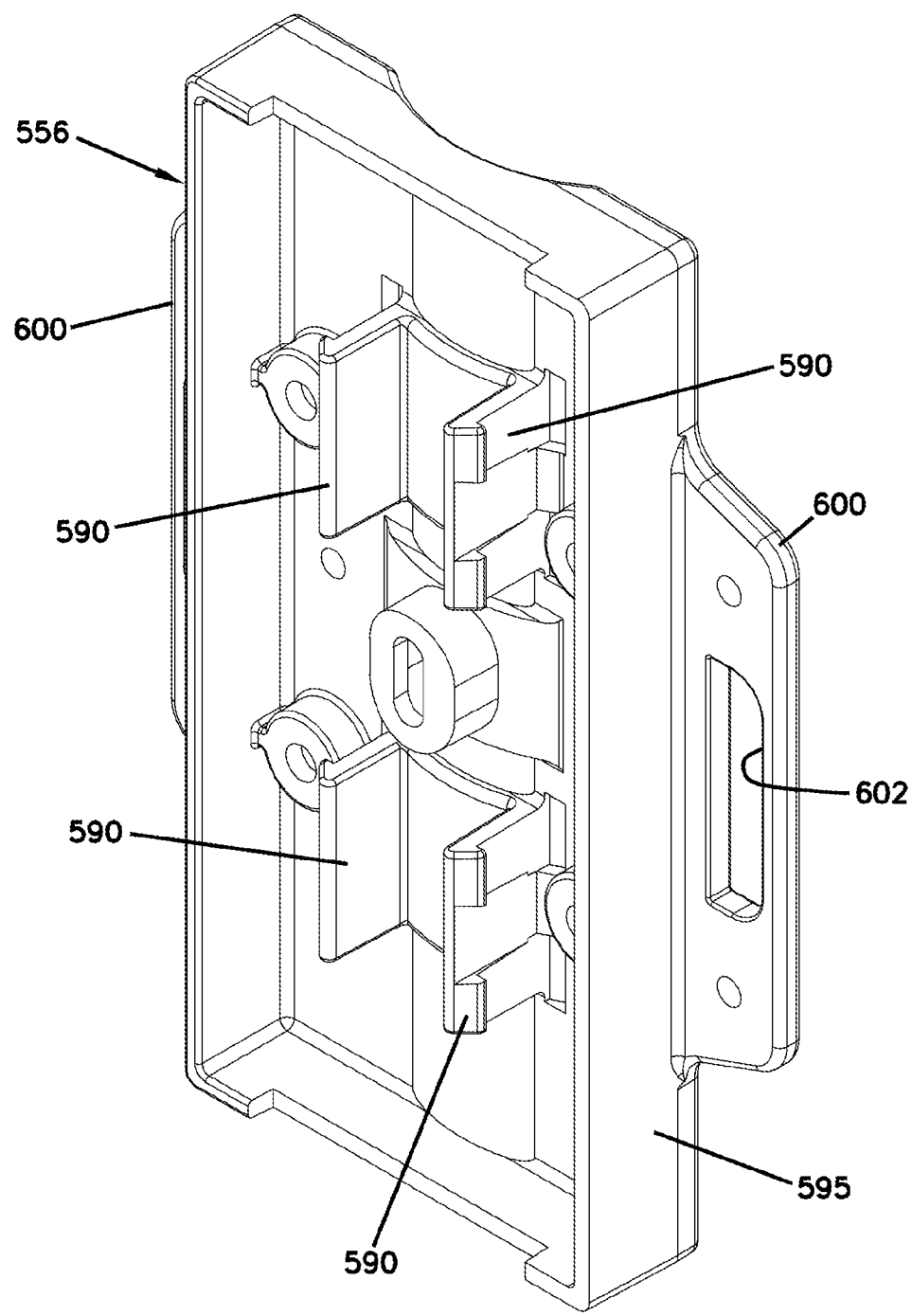
FIG. 34 is a perspective view of an example terminal mounting bracket that mounts a terminal to the slack storage bracket.

FIG. 34 illustrates another example terminal mounting bracket 556 that mounts a terminal 35, 52 to the bracket 54, 554. The terminal mounting bracket 556 includes rails 600 that extend outwardly from a base 595. Each rail 600 defines one or more openings 602. In certain examples, the rails 600 define elongated openings 602. The terminal 35, 52 attaches to the terminal mounting bracket 556 so that the rails 600 move unitarily with the terminal 35, 52. The rails 600 and openings 602 engage structure on the bracket 54, 554 as will be described in more detail herein. In the example shown, the terminal mounting bracket 556 is depicted as having a one-piece construction.

The terminal mounting bracket 556 is configured to receive the terminal 35, 52 in a snap-fit connection. For example, certain types of terminal mounting brackets 556 include latch arms 590 configured to latch to receiving structure on the terminal 35, 52. In certain examples, the latch arms 590 include at least one pair of outwardly facing latch arms. In the example shown, the latch arms 590 include two spaced pairs of outwardly facing latch arms. In certain implementations, the latch arms 590 are recessed within a cavity defined by the base 595.

Additional information about securing/retaining structures that can be utilized in the terminal mounting bracket 56 to hold the terminal 35, 52 can be found in U.S. Pat. Nos. 7,558,458, and 8,218,935, which are hereby incorporated by reference in their entireties.

In some implementations, a terminal 35, 52 includes rails and openings that provide the same function as the rails 300 and openings 302. Certain types of indexing terminals 35 include such rails. Certain types of multi-service terminals 52 include such rails. In such implementations, a terminal mounting bracket 56 may not be needed. Instead, the terminal 35, 52 may be able to attach directly to the bracket 54.

Referring now to FIGS. 7-11, the slack storage bracket 54 is depicted as having a one-piece construction. In other examples, however, the bracket 54 can be formed from multiple pieces. The bracket 54 has a front side 102 and a back side 104. The bracket 54 includes a base portion 100 elongated along a length L that extends between a first end 106 and a second end 108.

The base portion 100 is configured to mount to a surface. For example, in some implementations, the back side 104 of the base portion 100 is provided with an arcuate contour enabling the bracket 54 to accommodate mounting to a rounded structure, such as a pole or cable. Alternatively, the back side 104 may be flat or incorporate a different contour. In some implementations, one or more throughholes 158 extend from the front side 102 to the back side 104 of the base portion 100 to accommodate fasteners (e.g., mounting screws or other securement devices) to secure the slack storage bracket 54 to a mounting structure (e.g., a pedestal, a hand-hole, a utility pole, a cable strand, etc.). In other implementations, the base 100 defines slots 159 at the back side 104. One or more straps can be wrapped around the mounting structure, through the slots 159, and around the front side 102 of the base 100 to hold the bracket 54 to the mounting structure.

The bracket 54 may further include a first mounting extension 150 that extends from the slack storage structure 110 towards the first end 106 of the bracket 54 and second mounting extension 152 that extends from the slack storage structure 110 towards the second end 108 of the bracket 54. Fastener throughholes 158 also may be defined through the first and/or second mounting extensions 150, 152. In certain implementations, angled bracing walls 154, 156 may extend between the slack storage structure 110 and the respective mounting extension 150, 152.

The bracket 54 also includes a slack storage structure 110 at which a coil of cable can be disposed. The slack storage structure 110 is configured to hold the coil of cable such that the cable does not bend beyond a minimum bend radius. The slack storage structure 110 also is configured to hold the coil of cable sufficiently securely to retain the coil of cable at the bracket during normal use in the field.

Figure 12:
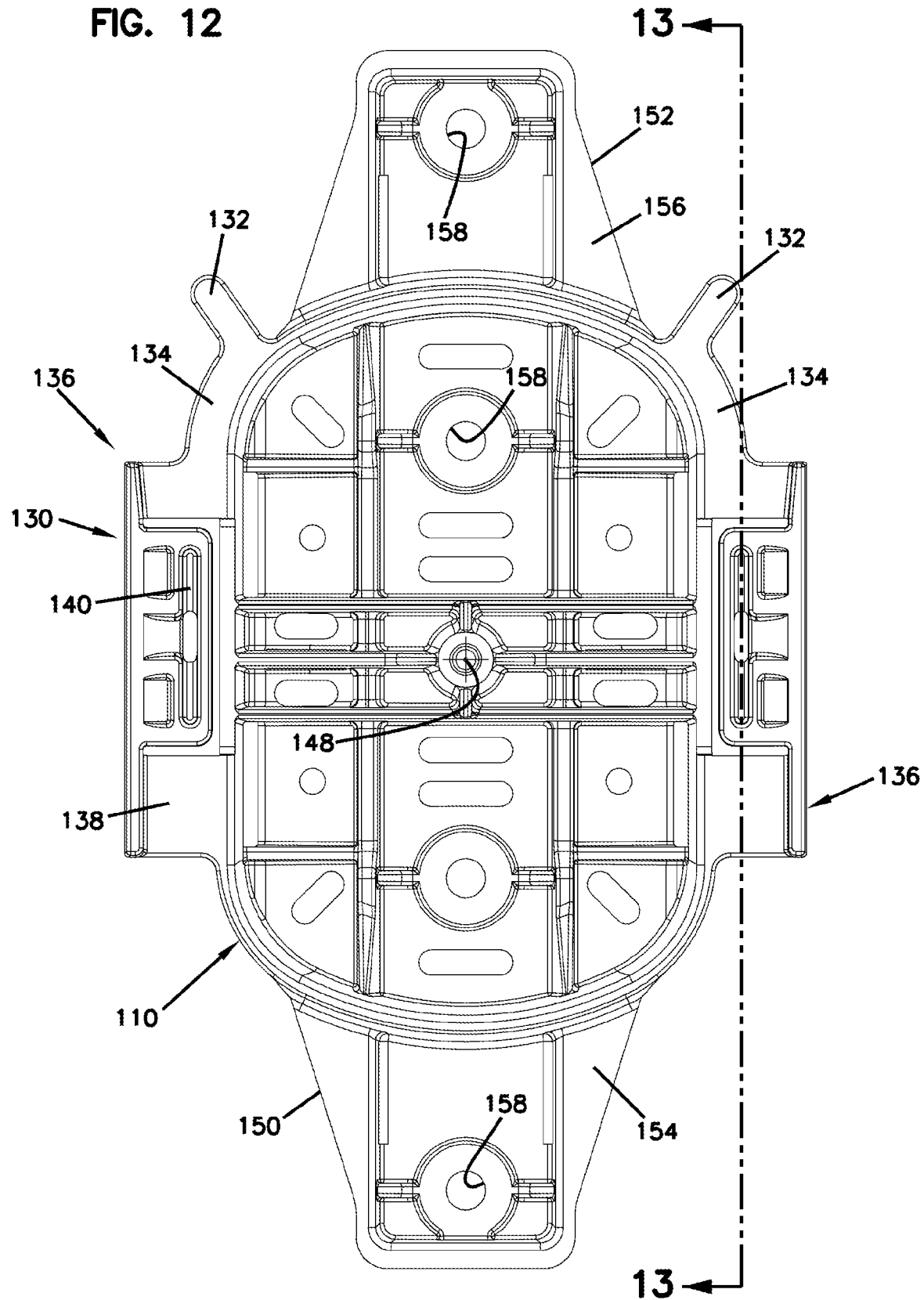
FIG. 12 is a front elevational view of the slack storage bracket of FIG. 11.
Figure 13:
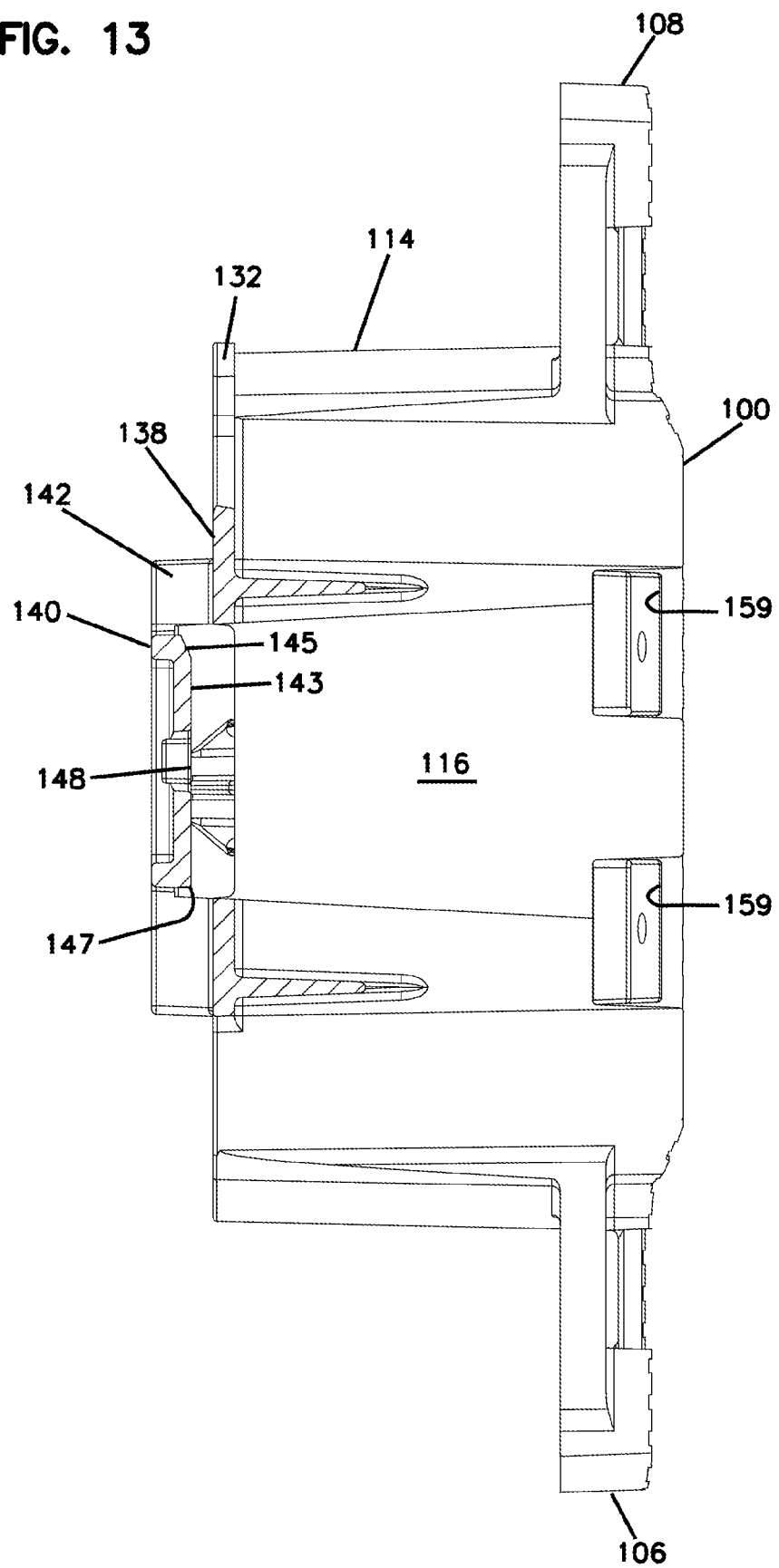
FIG. 13 is a cross-sectional view of the slack storage bracket of FIG. 12 taken along the 13-13 line.

In certain implementations, the bracket 54 also includes a mounting structure 130 configured to releasably hold a terminal (e.g., an indexing terminal 35 or a multi-service terminal 52) or a terminal mounting bracket 56. The terminal mounting bracket 56, which will be described in more detail herein with reference to FIGS. 12-13, is configured to connect to a terminal (e.g., an indexing terminal 35 or a multi-service terminal 52) to allow the terminal to be received at the mounting structure 130.

Figure 7:
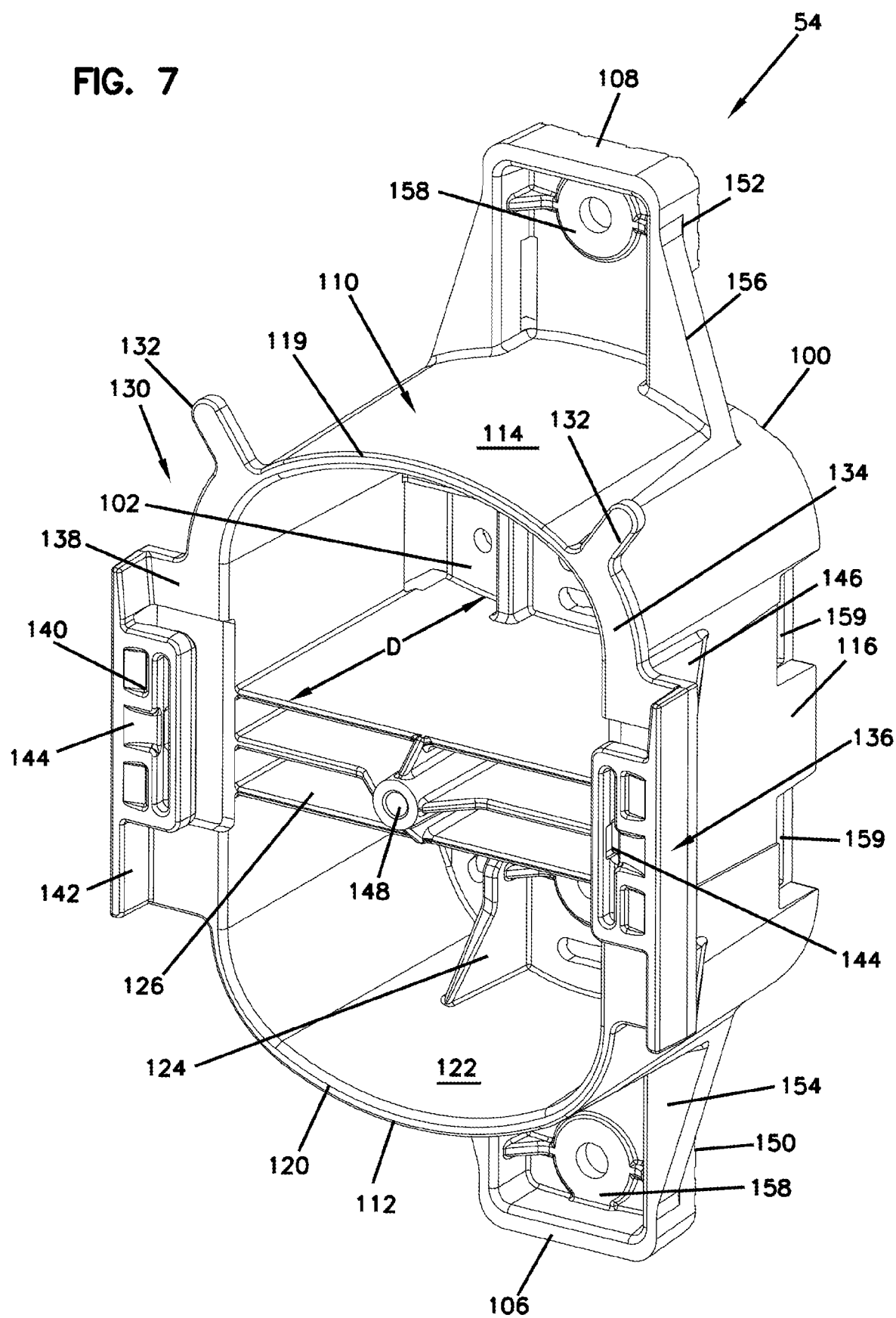
FIG. 7 is a front perspective view of an example slack storage bracket suitable for mounting at an installation site and holding slack length of cable.
Figure 8:
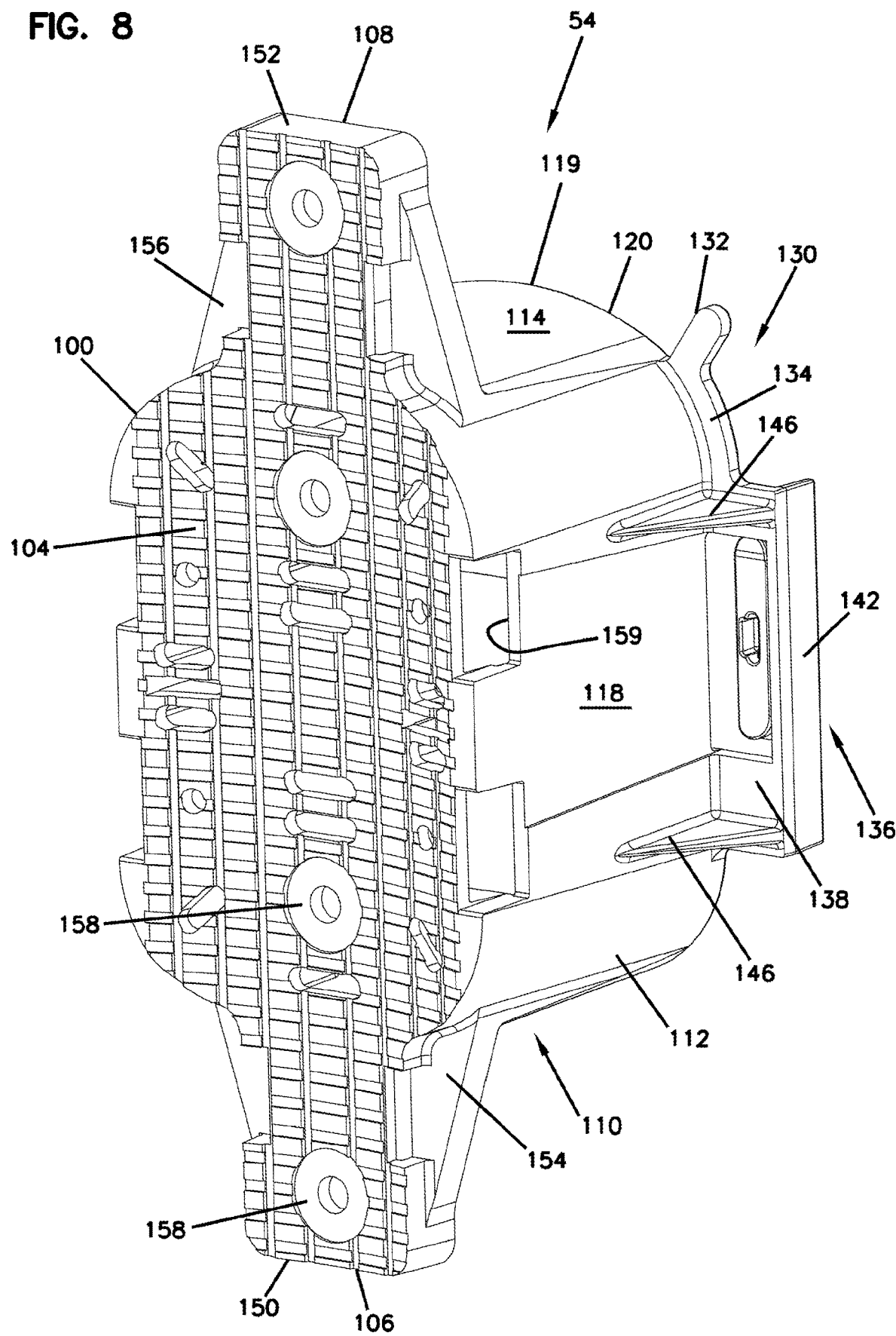
FIG. 8 is a rear perspective view of the example slack storage bracket of FIG. 7.

As shown in FIGS. 7-8, the slack storage structure 110 includes a wall framework that defines an outer perimeter 120. The wall framework is shaped (e.g., contoured) to inhibit excessive bending of the optical fibers in the coil. For example, a portion of the wall framework from which the coil hangs may be contoured with a curvature that is no less than a minimum bend radius of the optical fibers. One or more tabs 132 may extend outwardly from a front of the wall framework to facilitate retaining the coil on the wall framework. In certain implementations, the tabs 132 are disposed at the first end 106 of the base 100. In other implementations, however, the tabs 132 may be spaced around the outer perimeter 120 at regular intervals. In still other implementations, the tabs 132 are otherwise positioned to inhibit removal of the coil from the wall framework. In certain implementations, flanged sections 134 also may extend outwardly from the outer perimeter of the slack storage structure 110 to aid in retaining the cable.

In the example shown, the wall framework includes a first end wall section 112 and a second end wall section 114, each of which extend forwardly of the front side 102 of the base portion 100. The slack storage structure 110 further includes first and second side wall sections 116, 118, which also extend forwardly of the front side 102 of the base portion 100. The end wall sections 112, 114 and the side wall sections 116, 118 cooperate to create the wall framework. The wall framework also defines an inner cavity 122 of the slack storage structure 110. A depth D defines the depth the wall framework from a forward edge 119 to the front side 102 of the base portion 100.

The slack storage structure 110 of the bracket 54 further includes a plurality of elongate ribs 124 extending between the end walls 112, 114 and outwardly from the base portion 100 and into the inner cavity 122. The elongate ribs 124 provide structural rigidity to the slack storage structure 110. Further structural rigidity of the slack storage structure 110 is provided by a plurality of transverse ribs 126. The transverse ribs 126 extend between side walls 116, 118. In some implementations, the transverse ribs 126 extend farther into the cavity 122 than the elongate ribs 124. In an example, the transverse ribs 126 extend along a majority of the depth D of the continuous wall framework while the elongate ribs 124 extend no more than half the depth D of the continuous wall framework. In an example, the transverse ribs 126 extend fully along the depth D. In an example, the elongate ribs 124 extend less than ⅓ of the depth D of the continuous wall framework.

Figure 10:
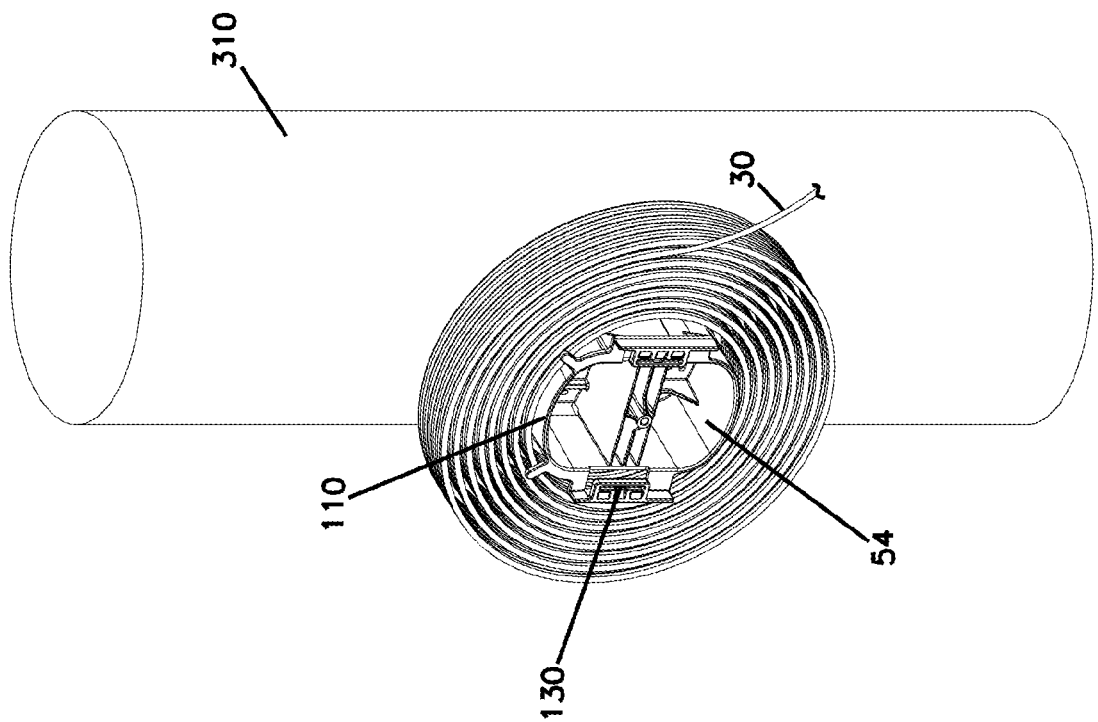
FIG. 10 illustrates slack length of a cable stored at the slack storage bracket of FIG. 9.
Figure 9:
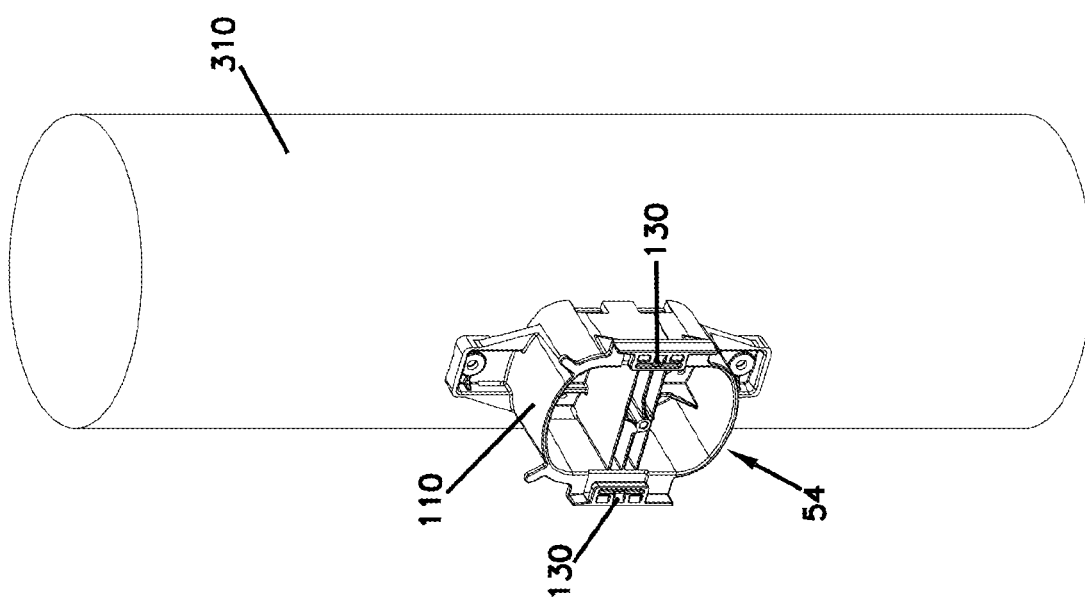
FIG. 9 illustrates the slack storage bracket of FIG. 7 mounted at an installation site.
Figure 11:
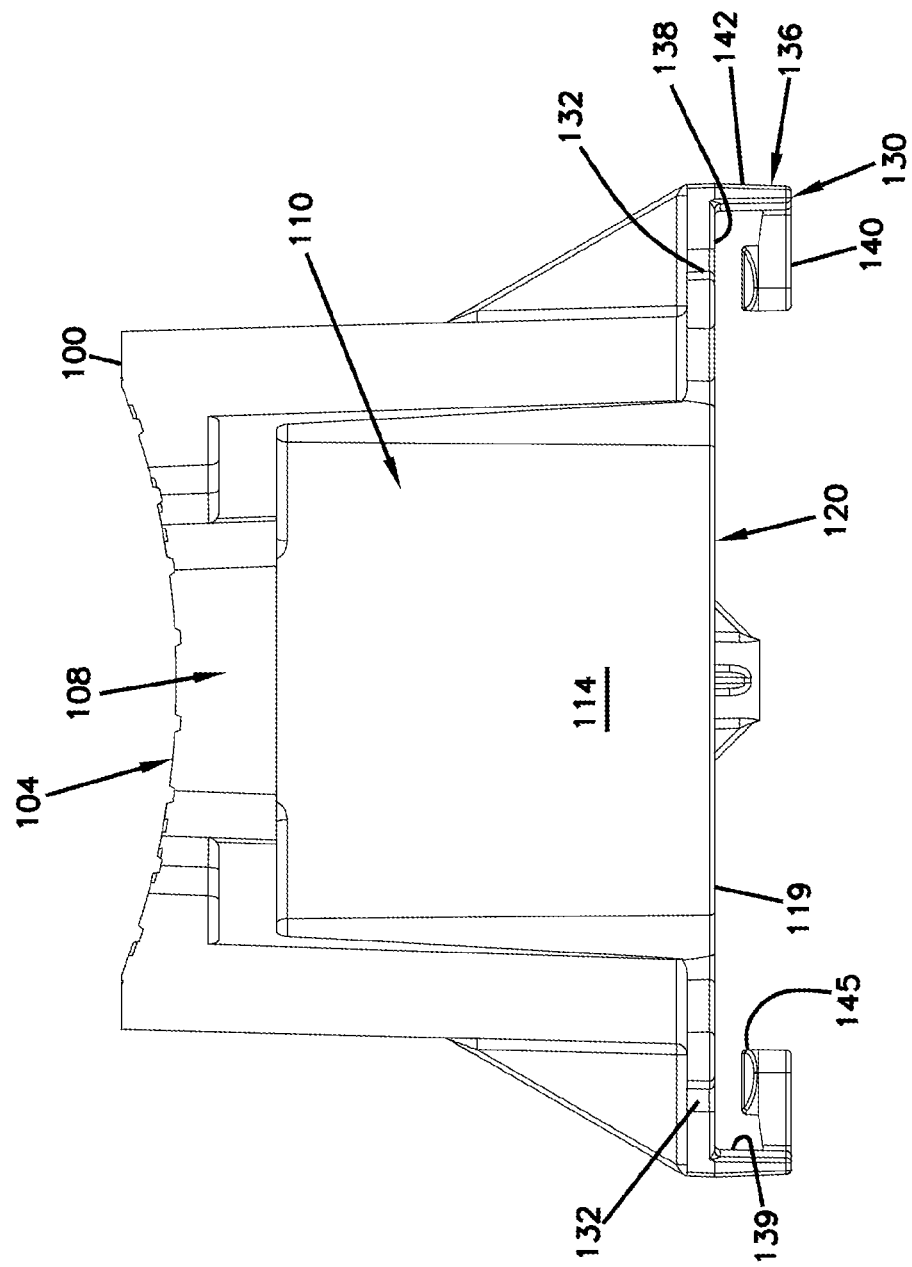
FIG. 11 is a top plan view of the slack storage bracket of FIG. 7.

FIGS. 9 and 10 illustrate an installation sequence for the slack storage assembly 50. The example shown illustrates the installation relative to a pole 310. However, it is understood that a similar installation sequence can be used for installations of the bracket 54 at a pedestal, hand-hole, or cable strand. In FIG. 9, the slack storage bracket 54 is secured to the pole 310 with screws through one or more of the plurality of throughholes 158. In alternative implementations, one or more straps could hold the bracket 54 to the pole 310.

FIG. 10 illustrates that a cable (e.g., cable 30 of FIG. 1) may be routed to the pole 310 and stored on the slack storage structure 110. In some examples, the cable can be wound around the bracket 54. In other examples, the cable can be pre-coiled into a bundle and hung from the bracket 54 (see FIG. 10). In some implementations, the free end of the cable can be unterminated. In other implementations, the free end of the cable can be connectorized by an optical connector. In certain examples, the connectorized end may be ruggedized. In certain examples, the connectorized end may be plugged into a terminal. In still other implementations, the free end of the cable can be terminated by an indexing terminal 35 or multi-service terminal 52 (e.g., was previously spliced to a terminal stub input cable). Notably, in FIG. 10, a forward face of the slack storage bracket 54 is sufficient to maintain the cable in position about the slack storage structure 110 without the presence of a terminal 35, 52.

Referring now to FIGS. 7 and 11-13, the mounting structure 130 is disposed at the front of the slack storage structure 110. The mounting structure 130 is configured to receive and retain a terminal 35, 52 or terminal mounting bracket 56. In certain implementations, the mounting structure 130 is configured to receive the terminal 35, 52 or terminal mounting bracket 56 in a sliding manner. In certain implementations, the mounting structure 130 is configured to receive the terminal 35, 52 or terminal mounting bracket 56 from only one direction. In certain implementations, the mounting structure 130 is configured to automatically hold the terminal 35, 52 or terminal mounting bracket 56 when the terminal 35, 52 or terminal mounting bracket 56 is moved into a particular position relative to the mounting structure 130. In certain implementations, the mounting structure 130 is configured to release the terminal 35, 52 or terminal mounting bracket 56 upon the application of a predetermined force to the terminal 35, 52 or terminal mounting bracket 56 in a predetermined direction relative to the mounting structure 130.

In some implementations, the mounting structure 130 includes one or more sleeve arrangements 136. In the example shown, the mounting structure 130 includes two sleeve arrangements 136 disposed at opposite sides of the slack storage structure 110. Each of the sleeve arrangements 136 includes a first elongate wall 138, a second elongate wall 140 substantially parallel thereto, and a side wall 142 connecting walls 138 and 140. In certain examples, a bracing wall 146 connects each end of the first elongate wall 138 to the slack storage structure 110 to provide structural rigidity to the sleeved arrangement 136. The first and second walls 138, 140 are spaced from each other to define a channel 139. The side wall 142 bounds one side of the channel 139. The opposite side of the channel 139 is open. In the example shown, the open sides of the channels 139 of the sleeve arrangements 136 face each other. The channels 139 are sized to receive (e.g., slidably receive) portions of the terminal 35, 52 or terminal mounting bracket 56.

In some implementations, the terminal 35, 52 or terminal mounting bracket 56 is installed at the bracket 54 by sliding edges of the terminal 35, 52 or terminal bracket 56 through the channels 139 of the sleeve arrangements 136. In certain implementations, the second elongated wall 140 of the sleeve arrangement 136 is shorter than the first wall 138. Accordingly, the terminal 35, 52 or terminal mounting bracket 56 can be aligned with the first wall 138 before attempting to insert the terminal 35, 52 or terminal mounting bracket 56 into the channel 139. In other implementations, the terminal 35, 52 or terminal mounting bracket 56 may enter the channel 139 using another motion (e.g., rotational motion).

In some implementations, a terminal 35, 52 can be secured to the bracket 54 when in the channel 139 using fasteners (e.g., screws). For example, fasteners can be inserted through the terminal 35, 52 (e.g., via a screw hole 83 at the back portion of the multi-service terminal 52) and into a fastener mount 148 defined by the bracket 54. The fastener would directly hold the terminal 35, 52 to the bracket 54. One example fastener mount 148 is shown in FIGS. 7 and 12. In the example shown, the fastener mount 148 is defined at and supported by the transverse ribs 126.

In other implementations, one of the elongate walls 138, 140 includes a protruding portion 143 that extends into the channel 139 from the wall. In the example shown, the protruding portion 143 extends from the second wall 140. The protruding portion 143 is sized to narrow the channel 139 to be thinner than the portion of the terminal 35, 52 or terminal mounting bracket 56 to be received. In such examples, the sleeve arrangements 136 are sufficiently flexible to enable the first and second walls 138, 140 to separate sufficient to receive the edges upon the application of a predetermined amount of force. The terminal 35, 52 or terminal mounting bracket 56 will be pinched or clamped between the first wall 138 and the protruding portion 143 of the second wall 140.

In certain examples, the protruding portion 143 defines a ramped surface 145 over which the terminal 35, 52 or terminal mounting bracket 56 cams when entering the channel 139 to facilitate sliding of the terminal 35, 52 or terminal mounting bracket 56 into the channel 139. In certain examples, the ramped surface 145 is defined at only one end of the protruding portion 143. Accordingly, the protruding portion 143 only facilitates insertion of the terminal 35, 52 or terminal mounting bracket 56 into the channel 139 from the one end of the channel 139.

In some examples, friction between the protruding portion 143 and the edges of the terminal or terminal mounting bracket holds the terminal or terminal mounting bracket at the bracket 54. In other implementations, however, the rails 66, 300 of the terminal 35, 52 or terminal mounting bracket 56 define openings (e.g., openings 68 in FIG. 3, openings 302 in FIG. 4, etc.) sized to receive the protruding portion 143 positioned in the channels 139. When the terminal 35, 52 or terminal mounting bracket 56 reaches a predetermine position relative to the channel 139 (i.e., when the protruding portion 143 aligns with the openings 68, 302), the protruding portion 143 no longer flexes the second wall 140 away from the first wall 138. Rather, the second wall 140 snaps towards the first wall 138 so that the protruding portion 143 enters the opening 68, 302 defined by the rails 66, 300 of the terminal 35, 52 or terminal mounting bracket 56. Accordingly, the terminal 35, 52 or terminal mounting bracket 56 is automatically retained by the sleeve arrangements 136 upon reaching a predetermined position relative to the sleeve arrangements 136.

In certain implementations, the terminal 35, 52 or terminal mounting bracket 56 can be removed from the slack storage bracket 54 by applying sufficient force to the terminal 35, 52 or terminal mounting bracket 56 relative to the slack storage bracket 54 in the terminal insertion direction. Application of sufficient force will cause the portion of the rail 66, 300 bounding the top of the opening 68, 302 to cam over the ramped surface 145 of the respective protruding portion 143, thereby causing the protruding portion 143 to push the second wall 140 away from the first wall 138. The rail 66, 300 can then be slid through the channel 139 in the insertion direction until the rail 66, 300 clears the channel 139, thereby releasing the terminal 35, 52 from the bracket 54.

In certain implementations, the protruding portion 143 does not define a ramped surface at an opposite end of the protruding portion from the ramped surface 145. Rather, the opposite end of the protruding portion 143 from the ramped surface 145 defines a shoulder 147 that faces towards the first end 106 of the bracket 54 (see FIG. 13). Accordingly, when the protruding portion 143 enters the opening 68, 302 of the rail 66, 300, the shoulder 147 abuts a portion of the rail 66, 300 bounding a bottom of the opening 68, 302. The shoulder 147 inhibits movement of the rail 66, 300 relative to the protruding portion 143 after an application of force in a direction opposite the insertion direction, even if the application of force would have been sufficient to release the terminal 35, 52 from the bracken if applied in the insertion direction.

Figure 14:
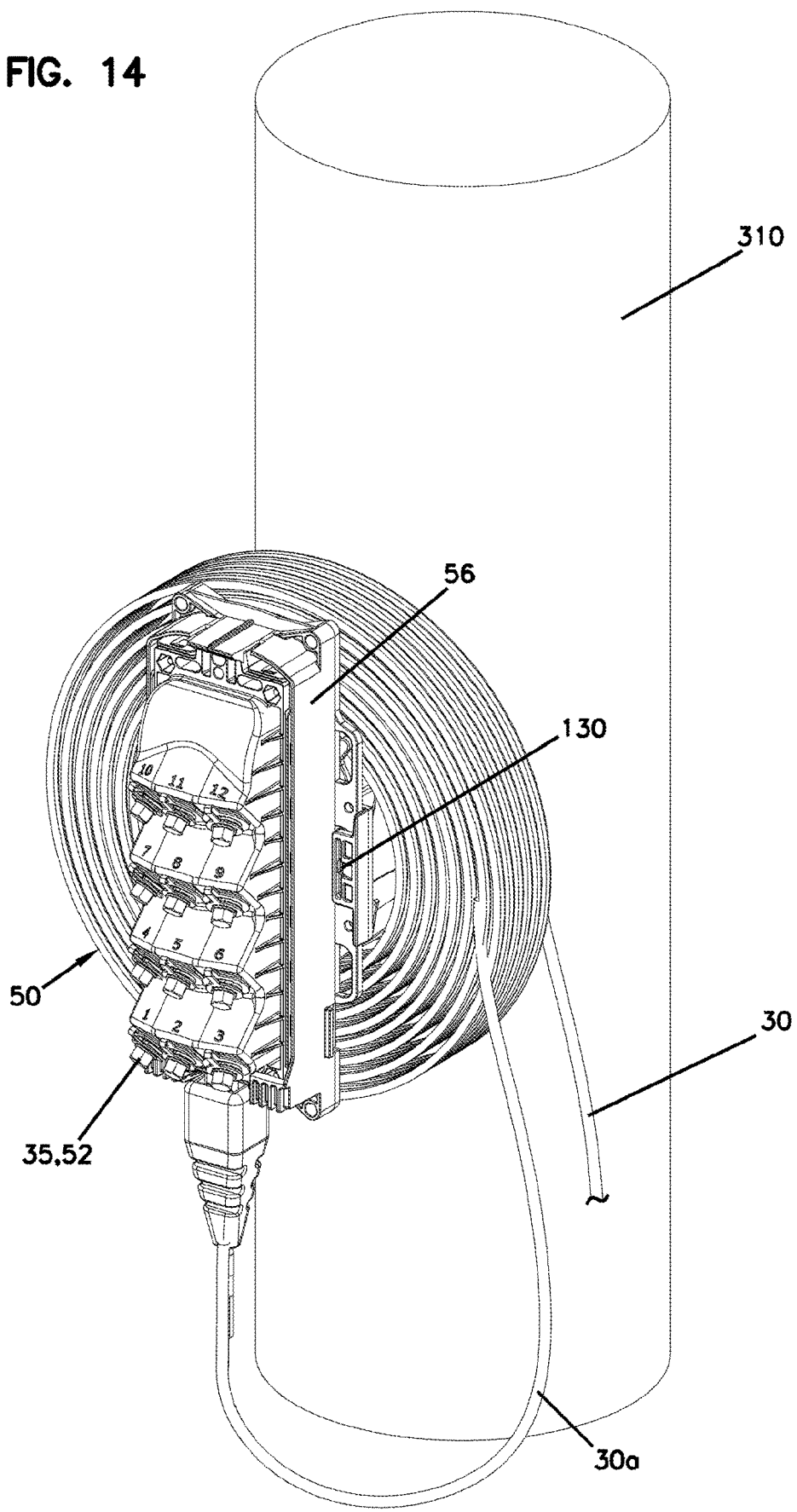
FIG. 14 illustrates slack length of a cable and an example terminal mounted to the slack storage bracket of FIG. 11.

The terminal mounting bracket 56 is used when the terminal 35, 52 is not designed to interact with the mounting structure 130 of the bracket 54. For example, certain types of terminal 35, 52 may not include the rails 66 defining openings 68 and/or may not include rails 66 sized and positioned to align with the channels 139 of the sleeve arrangements 136. Such a terminal 35, 52 can be mounted to the terminal mounting bracket 56, which can be mounted to the slack storage bracket 54 using the sleeve arrangements 136 described above. Once the terminal mounting bracket 56 has been secured to the slack storage bracket 54, the terminal 35, 52 may be mounted in the terminal mounting bracket 56 (see FIG. 14).

In certain examples of any of the above described implementations, a fastener can be inserted through the terminal 35, 52, optionally through the adapter mounting bracket 56, and through the fastener mount 148 to further secure the terminal 35, 52 to the slack storage bracket 54.

In accordance with certain aspects of the disclosure, a terminal 35, 52 may not be structured to enable direct mounting to the terminal mounting bracket 56. In such cases, an additional terminal adapter is utilized to mount the terminal 35, 52 to the terminal mounting bracket 56. In some implementations, the terminal is too large to mount directly to the terminal mounting bracket. In other implementations, the terminal is too small to mount directly to the terminal mounting bracket. In still other implementations, the terminal includes structure that interferes with structure of the terminal mounting bracket 56.

Figure 15:
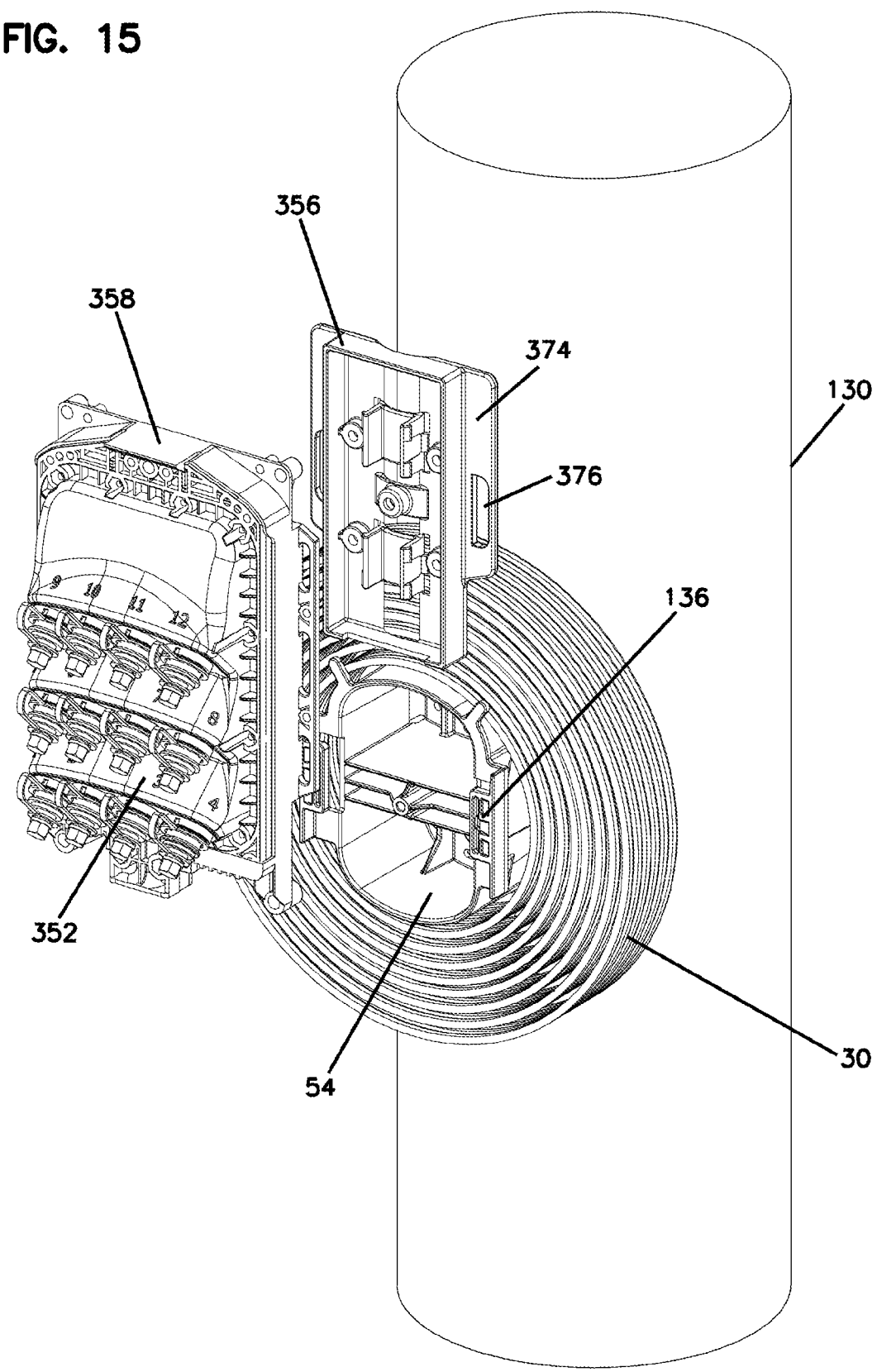
FIG. 15 illustrates another example terminal and an example terminal adapter exploded away from another example terminal mounting bracket, and the terminal mounting bracket exploded away from an example slack storage bracket.
Figure 16:
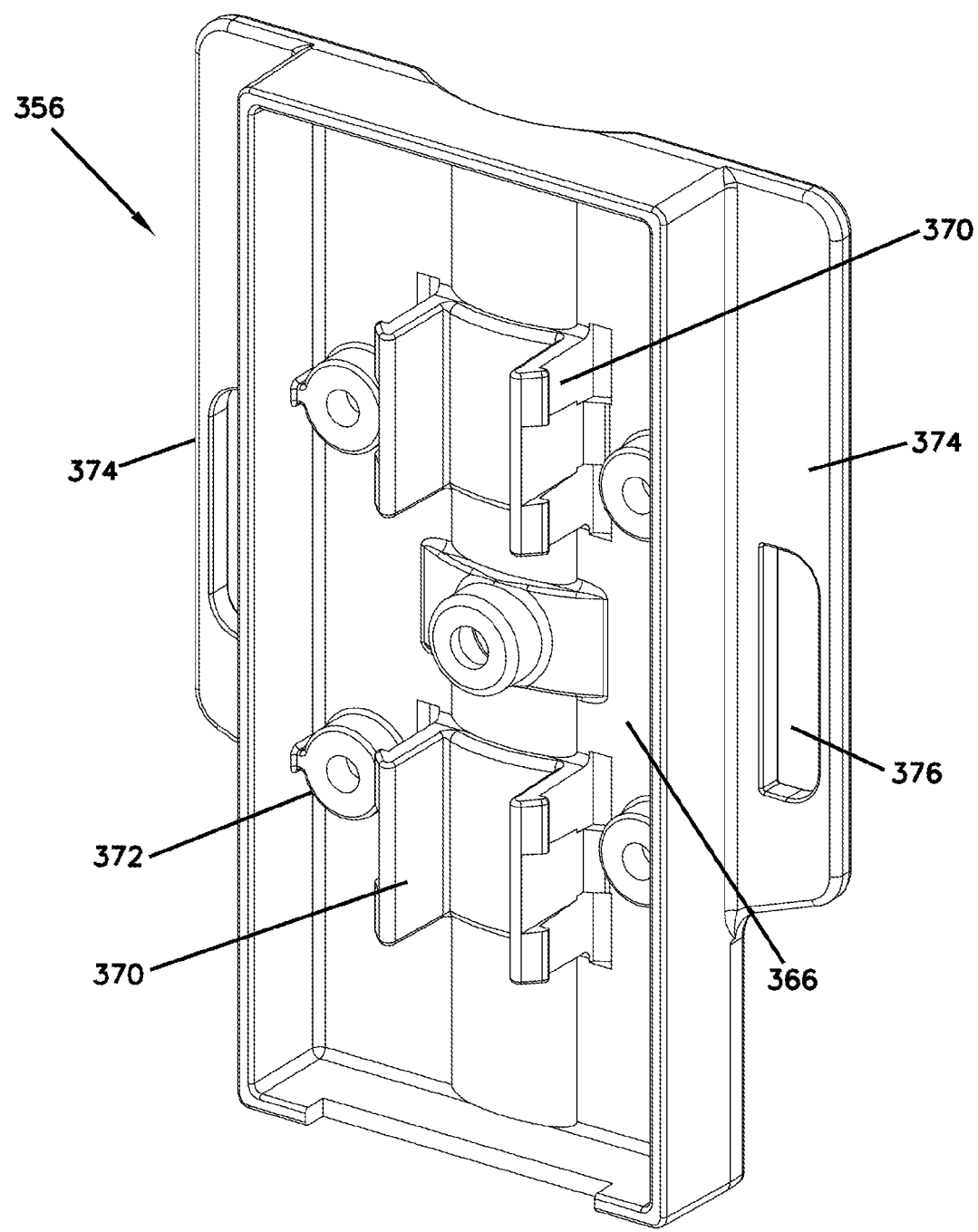
FIG. 16 is a front perspective view of the terminal mounting bracket of FIG. 15.
Figure 17:
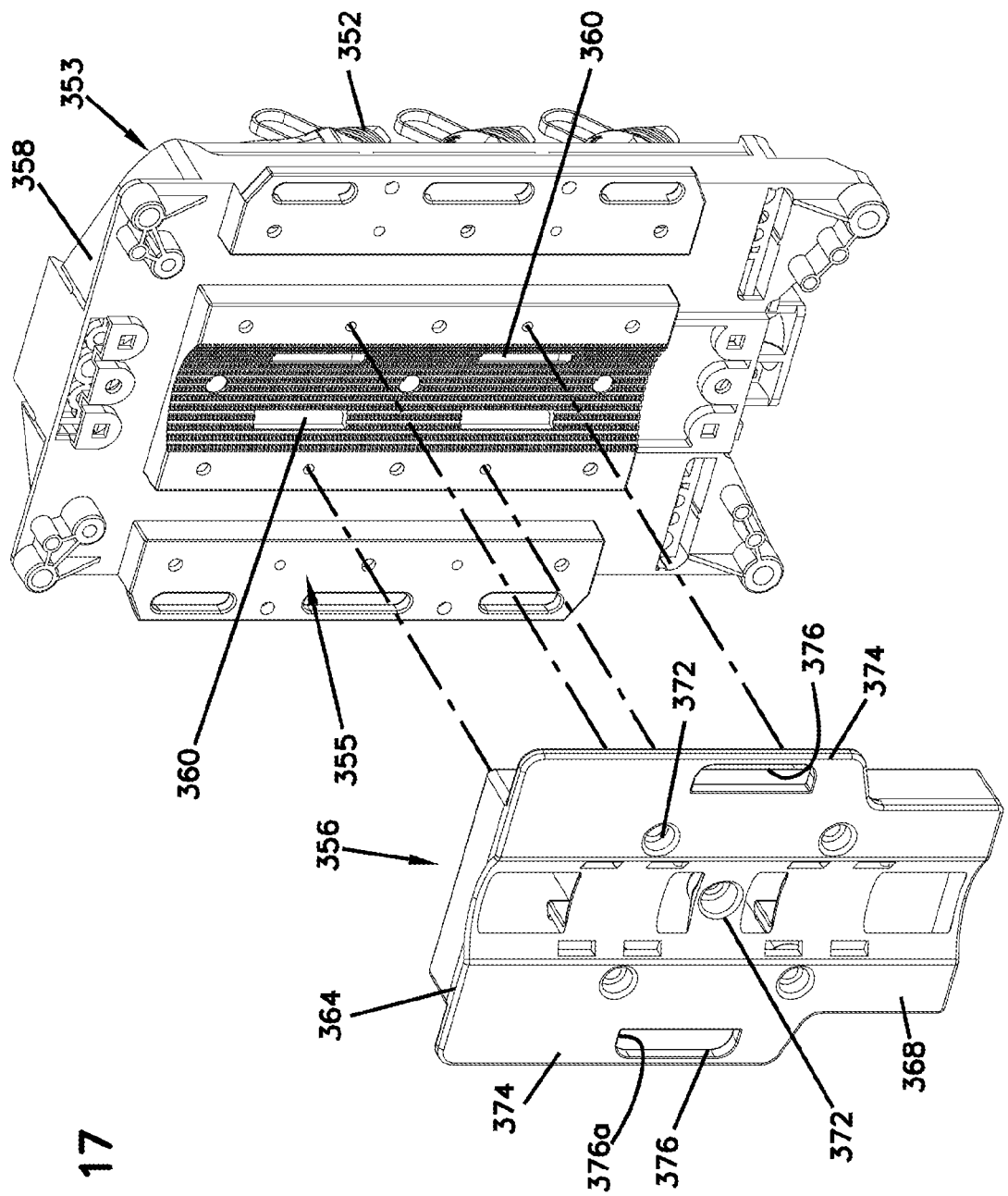
FIG. 17 illustrates the terminal mounting bracket of FIG. 15 exploded away from the terminal adapter of FIG. 15.

For example, FIGS. 15-17 illustrate an example terminal 352 that is not structured to enable direct mounting to either the slack storage bracket 54 or a terminal mounting bracket. The terminal 352 does not include side rails defining openings sized and positioned to cooperate with the protruding portion 143 of the slack storage bracket 54. An example terminal mounting bracket 356 shown in FIG. 15 includes rails 374 defining openings 376 configured to interface with the slack storage bracket 54. However, the example terminal 352 shown in FIG. 15 is sized too large to fit the example terminal mounting bracket 356 shown in FIG. 15. In other examples, however, the example terminal 352 could be too small to fit with the terminal mounting bracket 356 or otherwise structured to not securely engage or be engaged by the terminal mounting bracket 356. Accordingly, the terminal 352 is mounted to a terminal adapter 358, which can be mounted to the terminal mounting bracket 356. The terminal adapter 358 enables the same terminal mounting bracket 356 to be utilized with a wide variety of terminals 352.

In the example shown in FIG. 15, the terminal 352 is a 4×3 drop terminal. In other examples, however, the terminal 352 can be a multi-service terminal having a different port configuration (e.g., 1×3, 1×4, 1×6, 2×3, 2×4, 3×3, etc.), an indexing terminal having any of a variety of port configurations, or any other desired type of terminal. Further information about 4×3 drop terminals may be found in U.S. Pat. No. 7,512,304, which is hereby incorporated by reference in its entirety.

The terminal adapter 358 has a first side 353 and a second side 355. The first side 353 of the terminal adapter 358 is configured to securely engage the terminal 352. For example, the terminal adapter 358 may include latch arms at the first side 353. In certain implementations, the latch arms at the first side 353 may be configured similar to the flexible latch 228 of the terminal mounting bracket 56 shown in FIG. 3. In other implementations, the first side 353 of the terminal adapter 358 is otherwise configured to receive or otherwise securely engage the terminal 352. The second side 355 of the terminal adapter 358 is configured to securely engage the terminal mounting bracket 356. For example, in certain implementations, the terminal adapter 358 defines slots 360 accessible from the second side 355. In the example shown, the slots 360 are elongated. In the example shown, the slots 360 are centrally positioned on the terminal adapter 358.

The terminal mounting bracket 356 includes a base portion 364 having a front side 366 and a back side 368. The front side 366 is configured to cooperate with the second side 355 of the terminal adapter 358 to secure the terminal adapter 358 to the terminal mounting bracket 356. In the example shown in FIG. 16, the terminal mounting bracket 356 includes outwardly-extending, flexible latching arms 370. In certain examples, the latching arms 370 define laterally-facing hooks at the free ends. The latching arms 370 are sized to fit within the slots 360 defined by the terminal adapter 358. The latching arms 370 hook to the terminal adapter 358 via the slots 360.

As noted above, rails 374 extend laterally outwardly from opposite sides of the base portion 364. Each rail 374 defines at least one opening 376. The rails 374 are configured to be slidably received within the corresponding sleeve arrangements 136 of the slack storage bracket 54. The openings 376 are sized to receive the protruding portion 143 of each sleeve arrangement 136 to hold the terminal mounting bracket 356 relative to the slack storage bracket 54. Accordingly, the terminal mounting bracket 356 and the terminal adapter 358 cooperate to hold the terminal 352 relative to the slack storage bracket 54.

Figure 32:
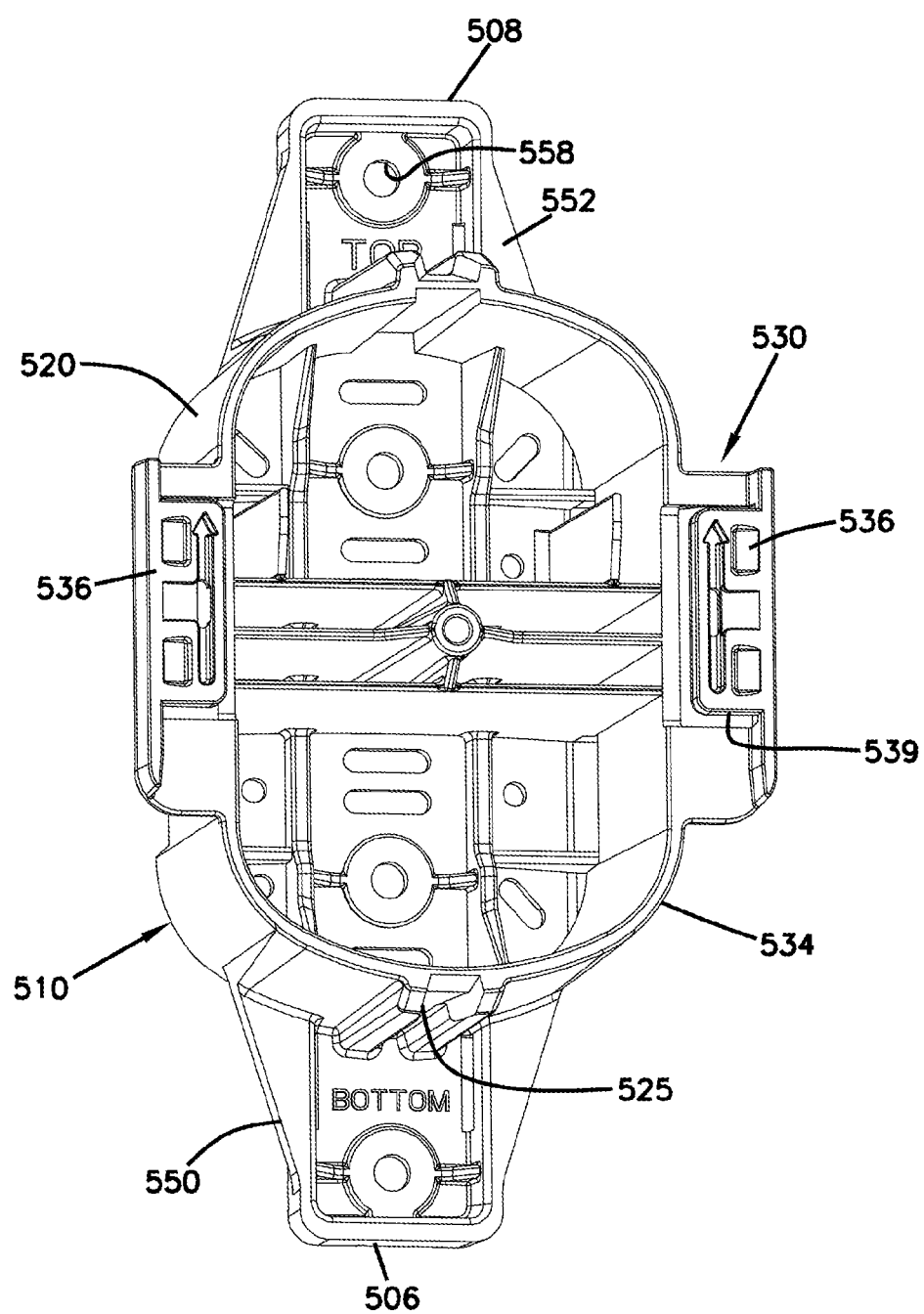
FIG. 32 is a front perspective view of another example slack storage bracket suitable for mounting at an installation site and holding slack length of cable.

FIG. 32 illustrates another example slack storage bracket 554 that is similar to the bracket 54 shown in FIG. 7. The bracket 554 has a front side (FIG. 7) and a back side. The bracket 554 includes a base portion elongated along a length that extends between a first end 506 and a second end 508. The base portion is configured to mount to a surface. For example, in some implementations, the back side of the base portion is provided with an arcuate contour enabling the bracket 554 to accommodate mounting to a rounded structure, such as a pole or cable. Alternatively, the back side may be flat or incorporate a different contour.

The bracket 554 also includes a slack storage structure 510 at which a coil of cable can be disposed. The slack storage structure 510 is configured to hold the coil of cable such that the cable does not bend beyond a minimum bend radius. The slack storage structure 510 also is configured to hold the coil of cable sufficiently securely to retain the coil of cable at the bracket during normal use in the field.

The bracket 554 may further include a first mounting extension 550 that extends from the slack storage structure 510 towards the first end 506 of the bracket 554 and second mounting extension 552 that extends from the slack storage structure 510 towards the second end 508 of the bracket 554. Fastener throughholes 558 also may be defined through the first and/or second mounting extensions 550, 552 to accommodate fasteners (e.g., mounting screws or other securement devices) to secure the slack storage bracket 554 to a mounting structure (e.g., a pedestal, a hand-hole, a utility pole, a cable strand, etc.). In other implementations, the mounting extensions 550, 552 define slots for receiving straps or ties.

In certain implementations, the bracket 554 also includes a mounting structure 530 configured to releasably hold a terminal (e.g., an indexing terminal 35 or a multi-service terminal 52) or a terminal mounting bracket 56, 556. The terminal mounting bracket 556, which will be described in more detail herein with reference to FIG. 34, is configured to connect to a terminal (e.g., an indexing terminal 35 or a multi-service terminal 52) to allow the terminal to be received at the mounting structure 530.

The mounting structure 530 is configured to receive and retain a terminal 35, 52 or terminal mounting bracket 56, 556. In certain implementations, the mounting structure 530 is configured to receive the terminal 35, 52 or terminal mounting bracket 56, 556 in a sliding manner. In certain implementations, the mounting structure 530 is configured to receive the terminal 35, 52 or terminal mounting bracket 56, 556 from only one direction. In the example shown in FIG. 32, the mounting structure 530 is configured to receive the terminal 35, 52 or terminal mounting bracket 56, 556 only from the bottom.

In certain implementations, the mounting structure 530 is configured to automatically hold the terminal 35, 52 or terminal mounting bracket 56, 556 when the terminal 35, 52 or terminal mounting bracket 56, 556 is moved into a particular position relative to the mounting structure 530. In certain implementations, the mounting structure 530 is configured to release the terminal 35, 52 or terminal mounting bracket 56, 556 upon the application of a predetermined force to the terminal 35, 52 or terminal mounting bracket 56, 556 in a predetermined direction relative to the mounting structure 530.

In some implementations, the mounting structure 530 includes one or more sleeve arrangements 536. In the example shown, the mounting structure 530 includes two sleeve arrangements 536 disposed at opposite sides of the slack storage structure 510. Each of the sleeve arrangements 536 defines a channel 539 that faces the channel of the other sleeve arrangement 536. The channels 539 are sized to receive (e.g., slidably receive) portions of the terminal 35, 52 or terminal mounting bracket 56, 556.

In some implementations, the terminal 35, 52 or terminal mounting bracket 56, 556 is installed at the bracket 554 by sliding edges of the terminal 35, 52 or terminal bracket 56, 556 through the channels 539 of the sleeve arrangements 536. In certain examples, each sleeve arrangement 536 includes a ramp or taper at the bottom to facilitate insertion of the terminal 35, 52 or terminal mounting bracket 56, 556 into the channel 539 from the bottom. Each sleeve arrangement 536 includes a protruding tab that snaps into an aperture defined by the terminal 35, 52 or terminal mounting bracket 56, 556 when the terminal 35, 52 or terminal mounting bracket 56, 556 are aligned with the protruding tab within the channel 539.

Figure 18:
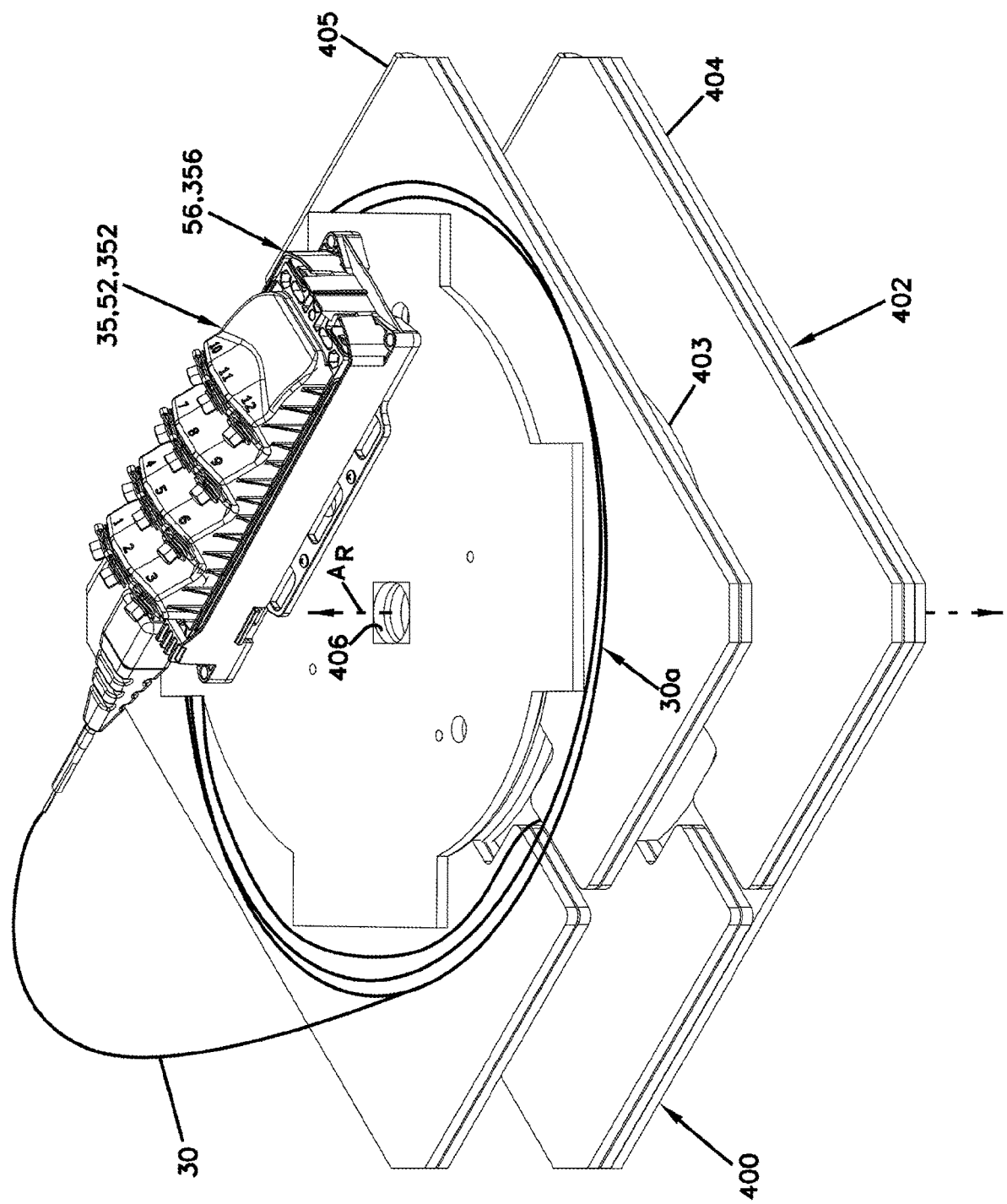
FIG. 18 is a perspective view of an example packaging and deployment system including a terminal and a terminal mounting bracket configured in accordance with the principles of the present disclosure releasably coupled to a disposable spool.

FIG. 18 illustrates a packaging and deployment system 400 for installing a terminal, optionally a terminal mounting bracket, and optionally a terminal adapter in the field. The packaging and deployment system 400 includes a disposable spool assembly 402 to which a terminal 35, 52, 352 releasably mounts (e.g., using fasteners, latches, etc.). Any components (e.g., terminal mounting bracket 56, 356 and/or terminal adapter 358) that mount the terminal 35, 52, 352 to the slack storage bracket 54 also can be releasably coupled to the disposable spool 402. In certain examples, the terminal 35, 52, 352 can be pre-mounted to the component(s) to form a terminal unit, which can be releasably coupled to the disposable spool. In an example, the terminal 35, 52 can be mounted to the terminal mounting bracket 56, which can be mounted to the disposable spool 402. In another example, the terminal 352 can be mounted to the terminal adapter 358, which can be mounted to the terminal mounting bracket 356, which can be mounted to the disposable spool 402.

In certain implementations, the disposable spool 402 includes a drum 403 extending between at least a first flange 404 and a second flange 405. A length of the distribution cable 30 (or other cable to be deployed) can be coiled around the drum 403. A first end of the distribution cable 30 is configured to be coupled to the network and a second, opposite end is optically coupled to (or configured to be optically coupled to) the terminal 35, 52, 352. Prior to deployment, a majority of the length of the cable 30 is coiled around the drum 403 between the flanges 404, 405.

In some examples, the first end of the cable 30 is connectorized. For example, the connectorized first end may be plugged into the second output of an indexing terminal. In another example, the connectorized first end may be plugged into an output of a multi-service terminal. In another example, the connectorized end may be a female connector configured to receive a connectorized end of a stub cable or tether. In other examples, the first end of the cable 30 is unterminated. For example, the unterminated first end can be spliced to a tether cable coupled to the network.

In some examples, the second end of the cable extends into the terminal 35, 52, 352. In other examples, the second end of the cable is connectorized with a male connector that plugs into an input port of the terminal 35, 52, 352. In other examples, the second end of the cable is connectorized with a female connector that receives a connectorized end of an input stub cable of the terminal. In still other examples, the second end of the cable 30 is spliced to a tether cable extending from the terminal 35, 52, 352. In some examples, the second end of the cable is optically coupled to the terminal 35, 52, 352 prior to deployment. In other examples, the second end of the cable is secured to the disposable spool 402 separate from the terminal 35, 52, 352.

A portion of the cable 30 towards the second end of the cable 30 extends out from the drum 403 and through the flange 405. In certain examples, the portion is optically coupled to the terminal 35, 52, 352. In certain implementations, the portion of the cable 30 can be sufficiently long to loop around in a coil 30a that can be attached to the flange 405 (e.g., using cable ties). The coil 30a can include one or more loops of the second portion 30a of the cable 30. When the majority of the cable 30 has been deployed, the terminal 35, 52, 352 and coil 30a can be removed from the disposable spool 402 and routed to a terminal installation site. In certain examples, the coil 30a provides sufficient length to enable splicing of the second end of the cable 30 to the terminal 35, 52, 352.

The packaging and deployment system 400 is configured in such a way as to facilitate uncoiling of the cable 30. For example, the disposable spool 402 has a through-hole 406 that defines a rotational axis $A_R$ of the disposable spool 402. The terminal 35, 52, 352 is mounted to the disposable spool 406 at a location offset from the through-hole 406 so that the terminal 35, 52, 352 does not interfere with the rod. A rod or other structure can be inserted into the through-hole 406 to enable rotation of the disposable spool 402. Accordingly, the cable 30 can be paid out by pulling on the first end while the disposable spool 402 is mounted to the rod or other structure. The terminal 35, 52, 352 and other optional components (e.g., terminal mounting bracket and/or terminal adapter) rotate in unison with the disposable spool 402.

When the desired amount of cable 30 has been paid out, the terminal 35, 52, 352 and any optional components are removed from the disposable spool 402. Any slack length of the cable 30 can be wound around the slack storage structure 110 of the slack storage bracket 54 as discussed above with reference to FIG. 10. The terminal 35, 52, 352 can be mounted to the mounting structure 130 of the slack storage bracket 54 as described above. In some examples, the terminal 35, 52, 352 is mounted to the slack storage bracket 54 before the slack cable length is disposed at the slack storage structure 110. In other examples, the terminal 35, 52, 352 is mounted to the slack storage bracket 54 after the slack cable length is disposed at the slack storage structure 110.

Additional information about disposable spools suitable for use in the packaging and deployment system 400 can be found in U.S. Pat. Nos. 9,042,700 and 9,097,870, each of which are hereby incorporated by reference.

Figure 19:
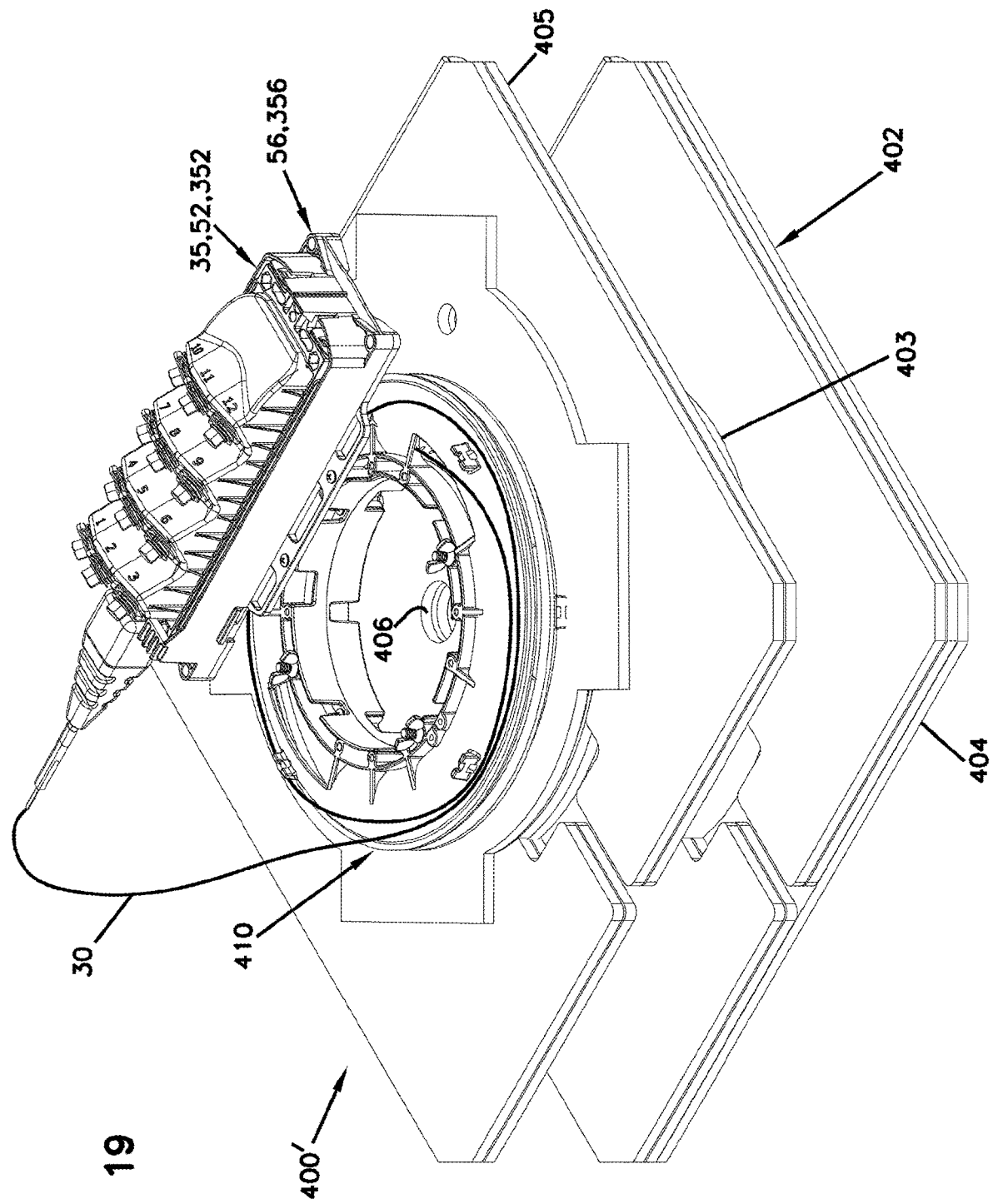
FIG. 19 is a perspective view of an example packaging and deployment system including a terminal, a terminal mounting bracket, and a slack management spool configured in accordance with the principles of the present disclosure releasably coupled to a disposable spool.
Figure 20:
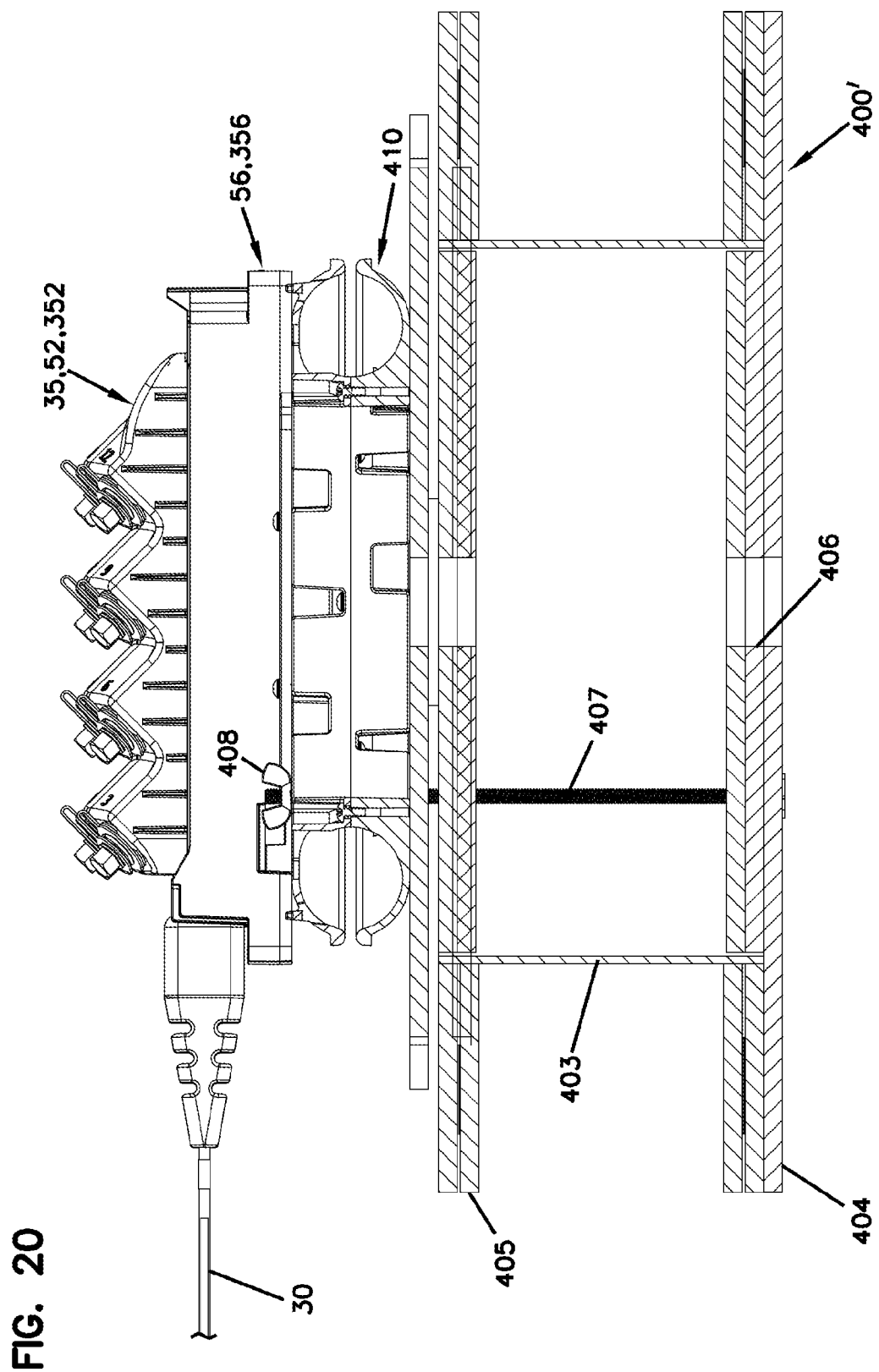
FIG. 20 is a transverse cross-section of the packaging and deployment system of FIG. 19.
Figure 21:
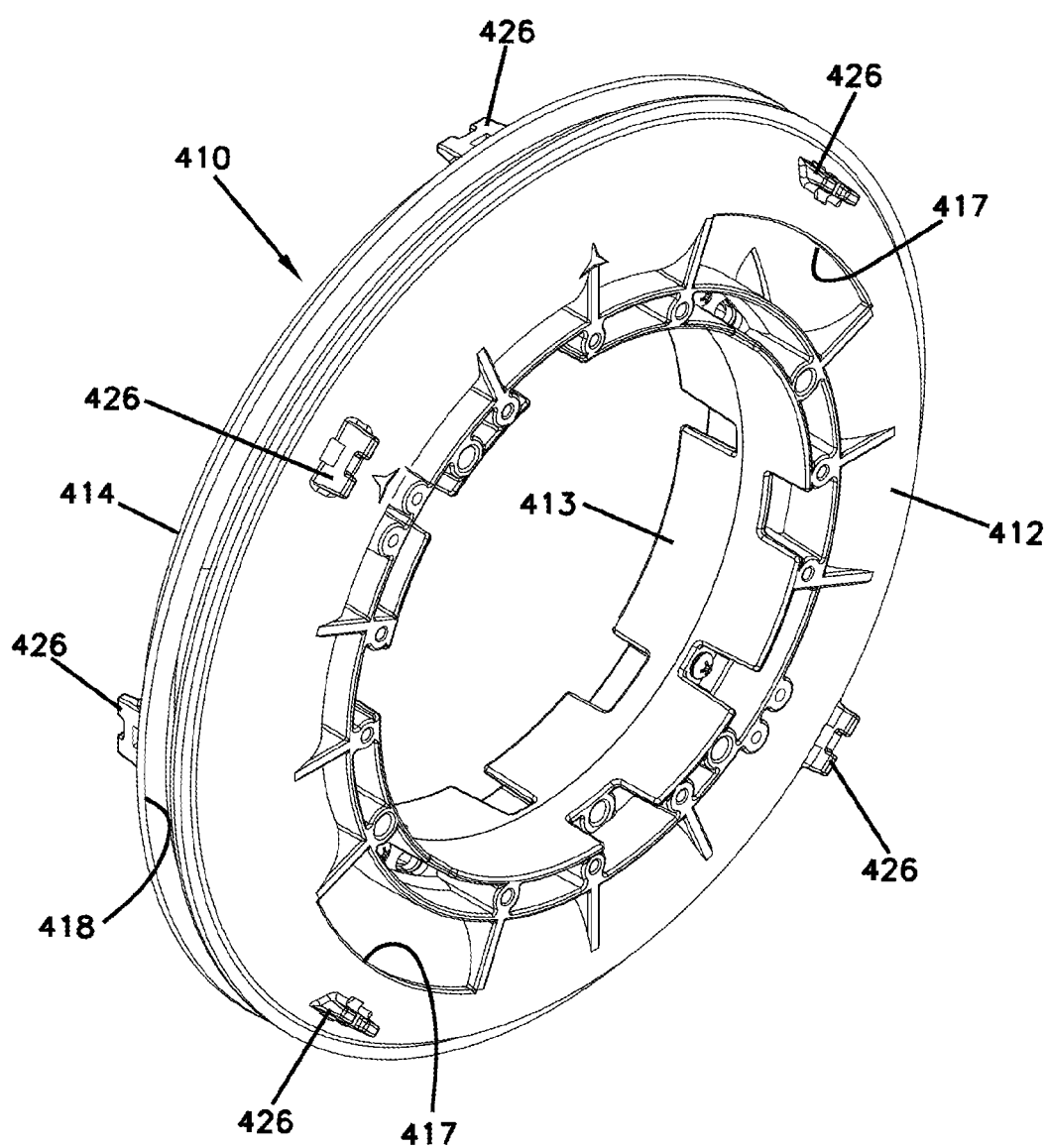
FIG. 21 is a perspective view of an example slack management spool suitable for use in holding slack length of a cable.
Figure 22:
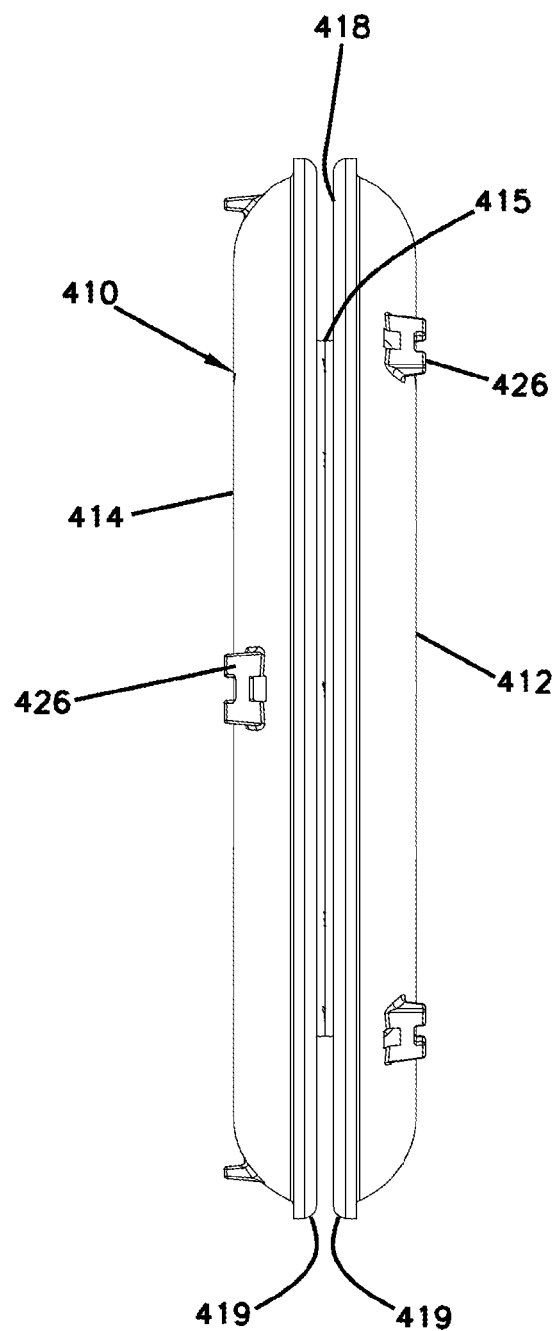
FIG. 22 is a side elevational view of the slack management spool of FIG. 21.

FIGS. 19-20 illustrates another example packaging and deployment system 400' that is substantially similar to the packaging and deployment system 400 of FIG. 18, except the packaging and deployment system 400' also includes a slack management spool 410 configured to manage the slack length of cable 30 at the slack storage bracket 54. The packaging system 400' also includes a disposable spool 402 about which a majority of the cable 30 is wound.

In use, the length of cable needed in the field will vary among different situations, but will be within a range of X to Y. In an example, the cable 30 has a length Y. In another example, the cable 30 has a length of Y plus a buffer length. The portion of the cable 30 wound around the disposable spool 410 has a length Z that is less than X (i.e., less than the amount that would be needed in the field). The slack management spool 410 stores the rest of the length of the cable 30. The length of the portion of the cable 30 stored on the slack management spool 410 is less than Z. During deployment, the Z length of cable 30 is paid out from the disposable spool 402. Then, some of the cable 30 can be paid out from the slack management spool 410 so that a total length of cable 30 paid out from the packaging and deployment system 400' is between about X and about Y.

The slack management spool 410 can be releasably coupled to the disposable spool 402. For example, the slack management spool 410 can be coaxially aligned with the disposable spool 402 (see FIG. 19). Accordingly, a rod or other structure can be positioned along a common rotational axis of the slack management spool 410 and the disposable spool 402. In such examples, packaging and deployment system 400' is rotated about the common axis to payout the portion of cable 30 from the disposable spool 402. In an example, a user continues to rotate the packaging and deployment system 400' about the common axis to payout some of the cable 30 from the slack management spool 410. In another example, the user removes the slack management spool 410 from the disposable spool 402 and then pays outs the cable 30 from the slack management spool 410.

In other examples, the slack management spool 410 is coupled non-coaxially to the disposable spool 402 so as to rotate in unison with the disposable spool 402. For example, the slack management spool 410 may be mounted to the disposable spool 402 at a location laterally offset from the common axis. In such examples, the cable 30 is paid out from the disposable spool 402, then the slack management spool 410 is removed from the disposable spool 402. The cable 30 is paid out from the slack management spool 410 after the slack management spool 410 is removed from the disposable spool 402.

In certain implementations, the slack management spool 410 can be mounted to an axial end of the disposable spool 402. In the example shown, one or more screws (e.g., T-screws), rods, or other fasteners may be inserted through the slack management spool 410 and the disposable spool 402 and held with nuts 408 or other securement members. In other examples, the slack management spool 410 can be latched to the disposable spool 402. In still other examples, the slack management spool 410 can be otherwise releasably secured to the disposable spool 402.

In some implementations, the slack management spool 410 is directly mounted to the disposable spool 402. In other implementations, a standoff arrangement can be provided between the slack management spool 410 and the disposable spool 402. In certain examples, the standoff arrangement includes spacing members disposed between the two spools 410, 402. For example, washers can be disposed on the fasteners. The standoff arrangement provides flexure of the slack management spool 410 during shipment and deployment of the cable from the disposable spool 402. As will be described in more detail herein, in certain implementations, the cable is wound onto and released from the slack management spool 410 by flexing the axial ends of the slack management spool 410 away from each other. Inhibiting flexing of at least one axial end of the slack management spool 410 aids in securing the cable within the slack management spool 410.

In some implementations, the terminal 35, 52, 352 and optional components 56, 356, 358 (if any) can be mounted to the slack management spool 410. For example, the terminal 35, 52, 352 and optionally the other components 56, 356, 358 can be mounted to the slack management spool 410 using fasteners (e.g., screws) or latches. In the shown, the terminal 35, 52, 352 is mounted to a terminal mounting bracket 56, which is mounted to the slack storage spool 410. In other implementations, the terminal 35, 52, 352 and optional components 56, 356, 358 (if any) can be mounted to the disposable spool 402 (e.g., using fasteners, latches, etc.). The terminal 35, 52, 352 is positioned to not interfere with a rod or other structure inserted through the hole 406 in the disposable spool 402.

FIGS. 21-25 illustrate an example slack management spool 410 configured in accordance with the principles of the present disclosure. The slack management spool 410 includes a drum 415 sized to correspond with a minimum bend radius of a cable (e.g., distribution cable 30). In certain implementations, the drum 415 has a radius that equals the minimum bend radius of the cable. In certain implementations, the drum 415 has a radius that is slightly larger than the minimum bend radius of the cable. In some implementations, the drum 415 defines a concave outer surface. In other implementations, the drum 415 defines a cylindrical outer surface.

The slack management spool 410 defines an outer slot 418 through which a cable can be routed onto a drum 415 of the slack management spool 410. The outer slot 418 is sized to apply friction to the cable as the cable passes through the outer slot 418. The outer slot 418 is sized to be less than a maximum width of the cable. In an example, the outer slot 418 is sized to be less than a diameter of a round cable. In another example, the outer slot 418 is sized to be less than a widest dimension of a flat, oblong, or other shaped cable. In certain implementations, the slot 418 expands to accommodate the cable when the cable passes through the slot 418.

In certain implementations, the slack management spool 410 includes a first flange 412 extending radially outwardly from a first axial end of the drum 415 and a second flange 414 extending radially outwardly from a second axial end of the drum 415. Outer circumferential edges of the flanges 412, 414 are spaced from each other to define the slot 418. In certain examples, the outer circumferential edges can define a tapered or curved lip 419 to aid in guiding the cable through the slot 418. The flanges 412, 414 are sufficiently flexible to enable expansion of the slot 418 to accommodate the cable as a user pulls or pushes the cable through the slot 418. The flanges 412, 414 are sufficiently rigid to retain the cable unless a user applies a force to the cable.

In certain implementations, a portion of each of the flanges 412, 414 curves towards the opposite flange 414, 412 as the flange 412, 414 extends radially outwardly. The flanges 412, 414 cooperate to define an annular passageway 416 (FIG. 25) around the drum 415. The cable guided through the slot 418 and onto the drum 415 is wound within the annular passageway 416. In some implementations, the outer passageway 416 is at least twice as large as the slot 418. In certain implementations, the outer passageway 416 is at least three times as large as the slot 418. In certain implementations, the outer passageway 416 is at least four times as large as the slot 418. In certain implementations, the outer passageway 416 is at least five times as large as the slot 418.

In certain implementations, the slack management spool 410 defines a central aperture 413 through the drum 415. In certain examples, the central aperture 413 is defined by a cylindrical inner surface of the drum 415. In certain examples, a rod or other supporting member can be inserted through the central aperture 413 to enable the slack management spool 410 to be spun on the rod to facilitate deployment of a cable wound on the slack management spool 410.

In certain implementations, at least one of the flanges 412, 414 defines a window aperture 417 that provides access to the annular passageway 416. In certain examples, the flange 412, 414 defines a plurality of circumferentially spaced window apertures 417. In certain examples, both flanges 412, 414 define one or more window apertures 417. In some examples, the window apertures 417 of the first flange 412 do not align with the window apertures 417 of the second flange 414. In other examples, however, the window apertures 417 of the first flange 412 align with the window apertures 417 of the second flange 414.

In certain examples, a second axial end of the cable can be inserted through the window aperture 417 so that the second axial end of the cable is disposed external of the slack management spool 410. The cable can then be wound within the annular passageway 416. Prior to deployment, the first axial end of the cable can be disposed within the annular passageway 416 or external of the slack management spool 410. The cable is deployed by pulling on the first axial end of the cable. The second axial end rotates with the slack management spool 410 during deployment.

Figure 23:
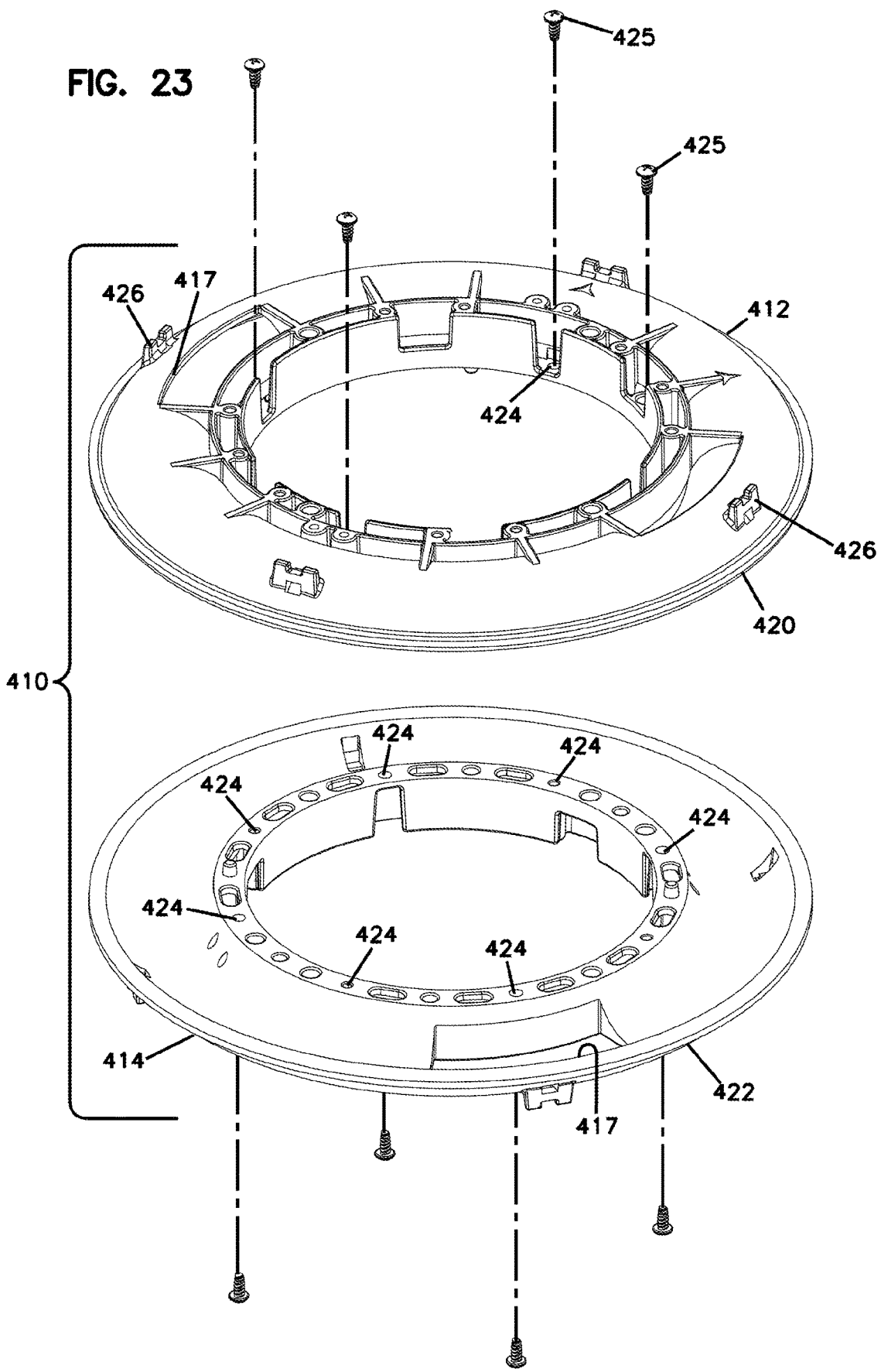
FIG. 23 is an exploded view of the slack management spool of FIG. 21.
Figure 24:
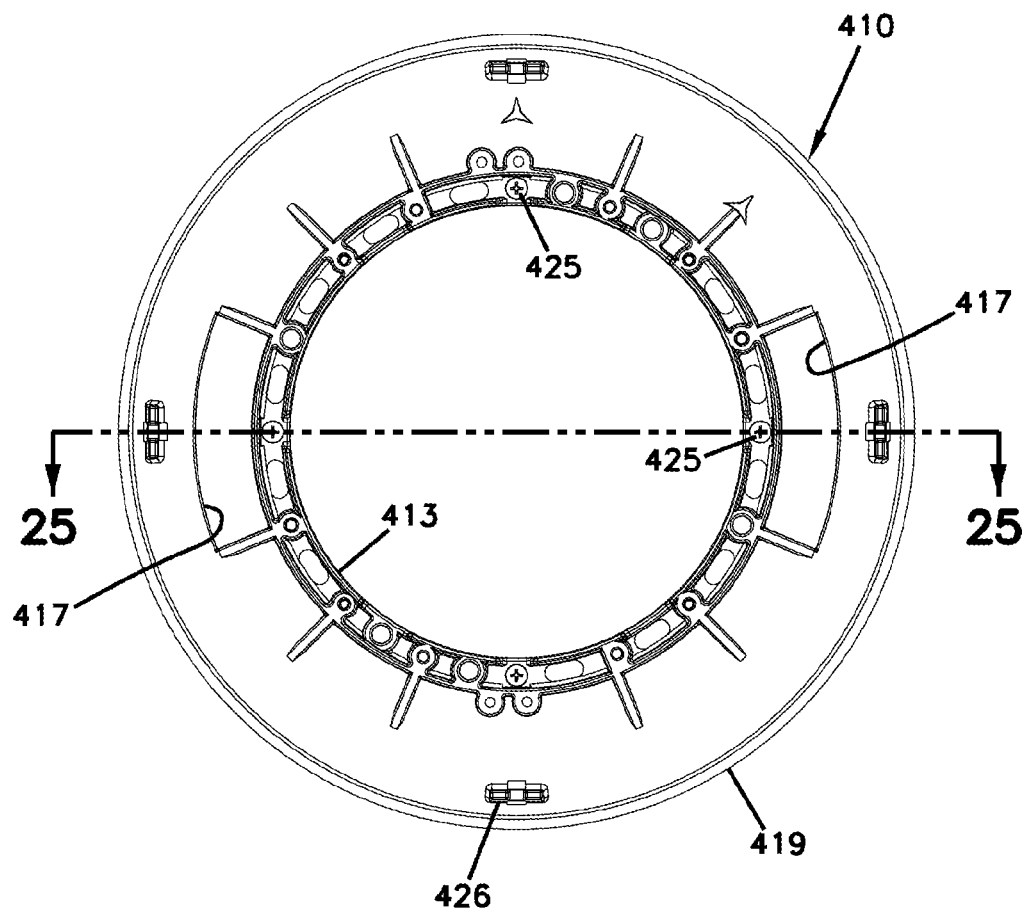
FIG. 24 is a front view of the slack management spool of FIG. 21.
Figure 25:
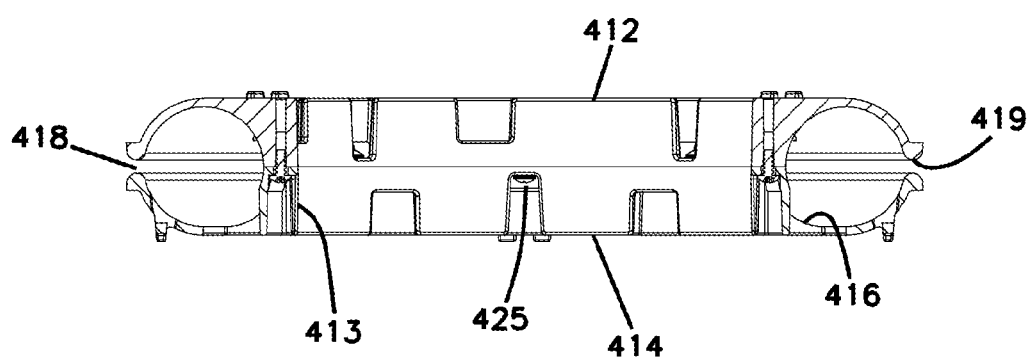
FIG. 25 is a cross-section of the slack management spool of FIG. 24 taken along the 25-25 line.

As shown in FIG. 23, the slack management spool 410 can be formed from a first housing member 420 and a second housing member 422 that couple together. In some implementations, the first and second housing members 420, 422 cooperate to define the drum 415. In other implementations, one of the housing members 420, 422 defines the drum 415. In certain implementations, each of the housing members 420, 422 defines one of the flanges 412, 414. Accordingly, the housing members 420, 422 cooperate to define the annular passageway 416. In certain examples, the first and second housing members 420, 422 are identical.

In some implementations, the first and second housing members 420, 422 latch together. In other implementations, the first and second housing members 420, 422 can be attached using fasteners (e.g., screws) 425. In certain such implementations, each housing member 420, 422 defines fastening apertures 424 through which the fasteners 425 can be inserted. In certain implementations, each housing member 420, 422 can define fastener support structures defining inner threaded channels in which to receive the fasteners 425. In certain examples, each housing member 420, 422 includes fewer fastener support structures than fastening apertures 424.

In use, a user winds a cable or portion of a cable onto the slack management spool 410 by threading a second axial end of the cable through the outer slot 418. In some implementations, the threaded end of the cable is disposed within the annular passageway 416. In other implementations, the threaded end is routed through one of the window apertures 417 of one of the flanges 412, 414. The user continues to wind the cable onto the slack management spool 410 through the slot 418 to wrap the cable around the drum 415. In some implementations, the cable is wound until the opposite second axial end of the cable is received in the passageway 416. In other implementations, the opposite second axial end of the cable remains external of the slack management spool 410.

In certain implementations, the outer slot 418 is positioned relative to the drum and is sized relative to the cable so that the user winds the cable over the center of the cable and onto the drum 415. Accordingly, the size of the slot 418 inhibits the user from twisting the cable during winding. The size of the slot 418 also inhibits the cable from passing through the slot 418 without force being applied by the user. Accordingly, the annular passageway 416 can contain the cable against a spring force provided by bending strength members (e.g., fiberglass rods) of the cable.

Figure 31:
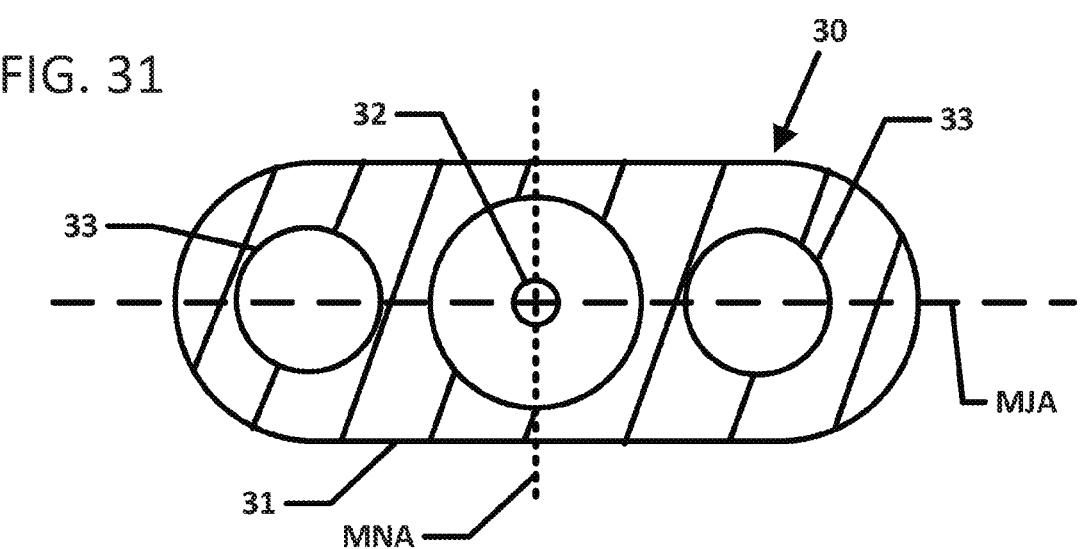
FIG. 31 illustrates an example optical cable that can be wound on the slack management spool.

For example, FIG. 31 illustrates an example optical cable 30 that can be wound on the slack management spool 410. The cable 30 includes one or more optical fibers 32 disposed within a jacket 31. One or more strength members 33 also are disposed within the jacket 31. In some examples, the strength members 33 are formed of glass reinforced polymer. In other examples, the strength members 33 can be formed of fiberglass, braided steel, or other desired material. In certain examples, the material forming the strength members 33 is sufficiently elastic as to apply a spring force when bent.

In certain implementations, the cable 30 is a flat cable (e.g., see FIG. 31). In such implementations, the cable jacket 31 includes two generally flat sides connected by opposing curved sides. The one or more optical fibers 32 are disposed between two strength members 33 adjacent the curved sides. In such implementations, the cable 30 bends against the spring force along a major axis MJA that extends between the two strength members 33. The cable 30 resists bending along a minor axis MNA, which extends perpendicular to the major axis MJA, more than the cable 30 resists bending along the major axis MJA. In certain implementations, the spring force of the strength members 33 is sufficiently strong to inhibit coiling of the cable 30 absent a force holding the cable 30 in the coil.

Referring back to FIGS. 21-25, the slack management spool 410 can be used to store excess length of the cable after deployment of the cable. The slack management spool 410 can be mounted to a bracket (e.g., slack storage bracket 54, an aerial bracket 90), pole, behind a wall box, etc. when the cable has been deployed. Part of the cable also can be wound back on the slack management spool 410 if too much is initially paid out from the slack management spool 410.

Figure 30:
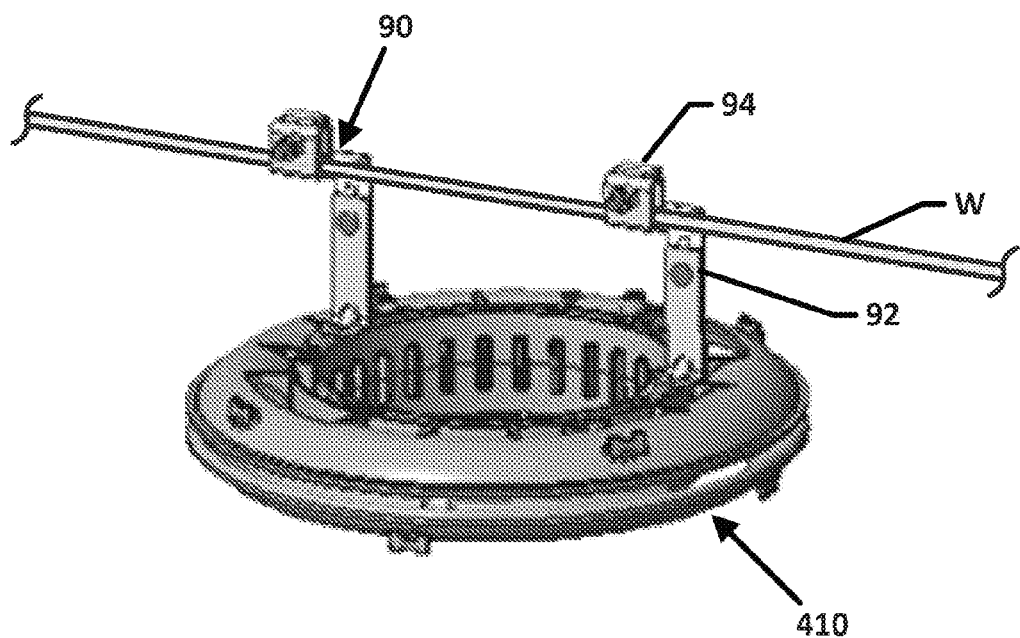
FIG. 30 illustrates an aerial bracket that includes an attachment arm for attaching to the slack management spool and a hanger by which the aerial bracket is hung from a line.

For example, FIG. 30 illustrates an aerial bracket 90 that includes an attachment arm 92 for attaching to the slack management spool 410 and a hanger 94 by which the aerial bracket 90 is hung from a line W (e.g., a power line, a steel cable, etc.). The attachment arm 92 removably connects to the slack management spool 410 (e.g., by a fastener, latch, snap-fit, or other connection). In some implementations, the hanger 94 clamps the line W. In other implementations, the hanger 94 traps or otherwise secures to the line W.

Figure 33:
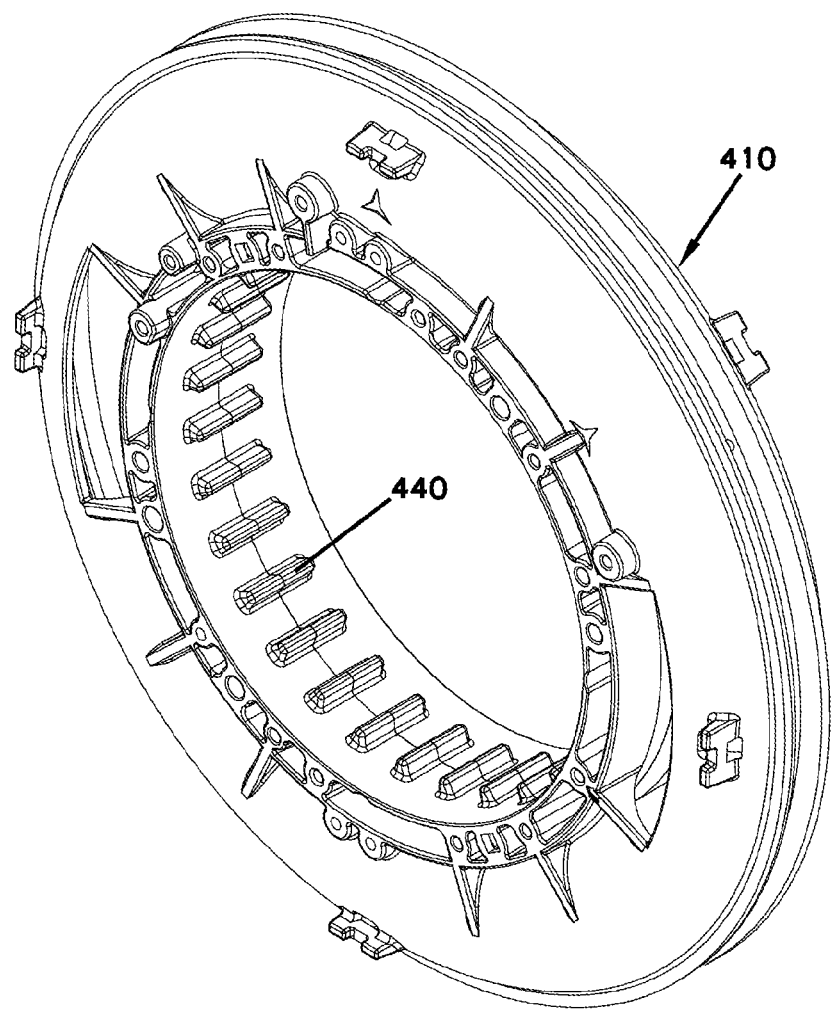
FIG. 33 is a perspective view of another example slack management spool suitable for use in holding slack length of a cable.

In certain implementations, the slack management spool 410 includes teeth or bumps 440 along a circumference of the central aperture 413 of the slack management spool 410 (e.g., see FIG. 33). The teeth 440 extend radially inwardly from the inner surface of the slack management spool 410. In certain examples, the teeth 440 may aid in maintaining the slack storage spool 410 on the slack storage structure 110, 510 of the bracket 54, 554.

In certain examples, the teeth 440 may aid in inhibiting rotation of the slack storage spool 410 on the slack storage structure 110, 510 of the bracket 54, 554 or on a spindle. For example, the slack storage structure 510 of the bracket 554 includes a catch arrangement 525 defining a gap between two stop members in which one of the teeth 440 may seat when the slack storage spool 410 is mounted to the bracket 554. Engagement between the tooth 440 and the stop members of the catch arrangement 525 inhibits rotation of the spool 410. In the example shown in FIG. 32, the slack storage structure 510 includes two catch arrangements 525 arranged at opposite ends of the slack storage structure 510.

Additional information about slack management spools suitable for use in the packaging and deployment system 400 can be found in copending U.S. application Ser. No. 14/427,603, filed Feb. 8, 2017, and titled "Fiber Demarcation Point and Slack Storage," the disclosure of which is hereby incorporated herein by reference.

Figure 26:
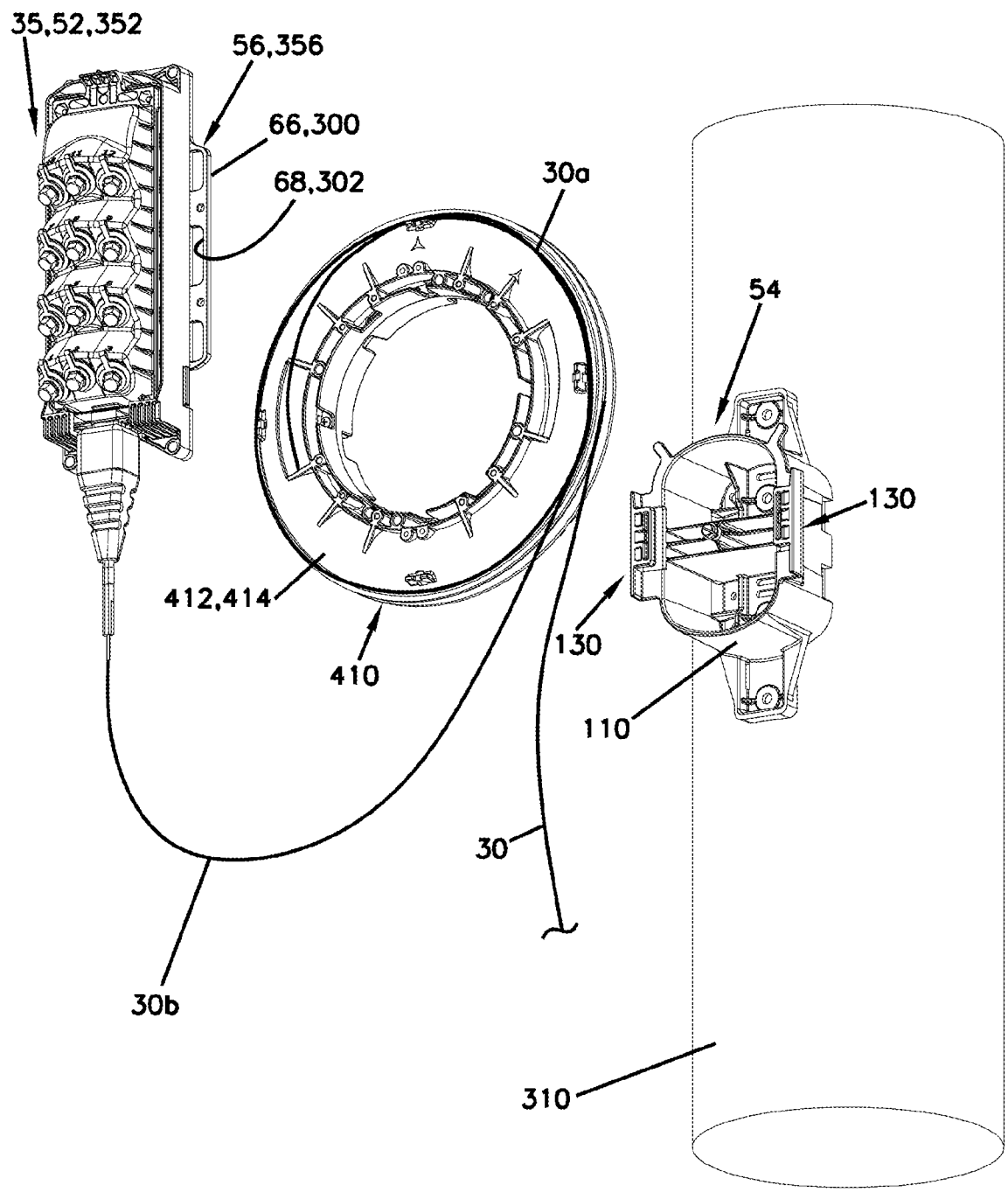
FIG. 26 illustrates the slack management spool, terminal, and terminal mounting bracket of FIG. 20 spaced from a slack storage bracket at an installation site.
Figure 27:
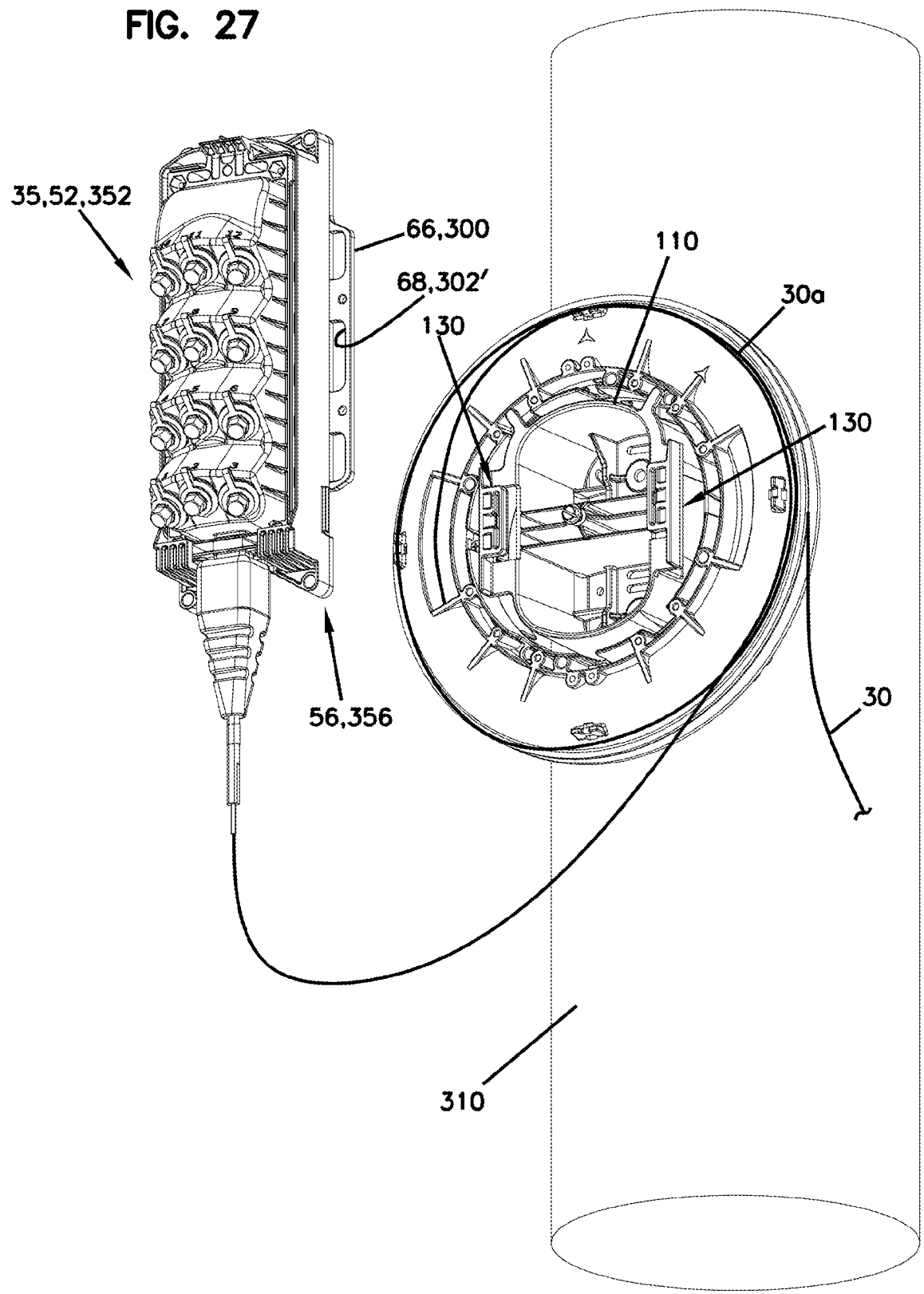
FIG. 27 illustrates the slack management spool mounted to the slack storage bracket of FIG. 26.
Figure 28:
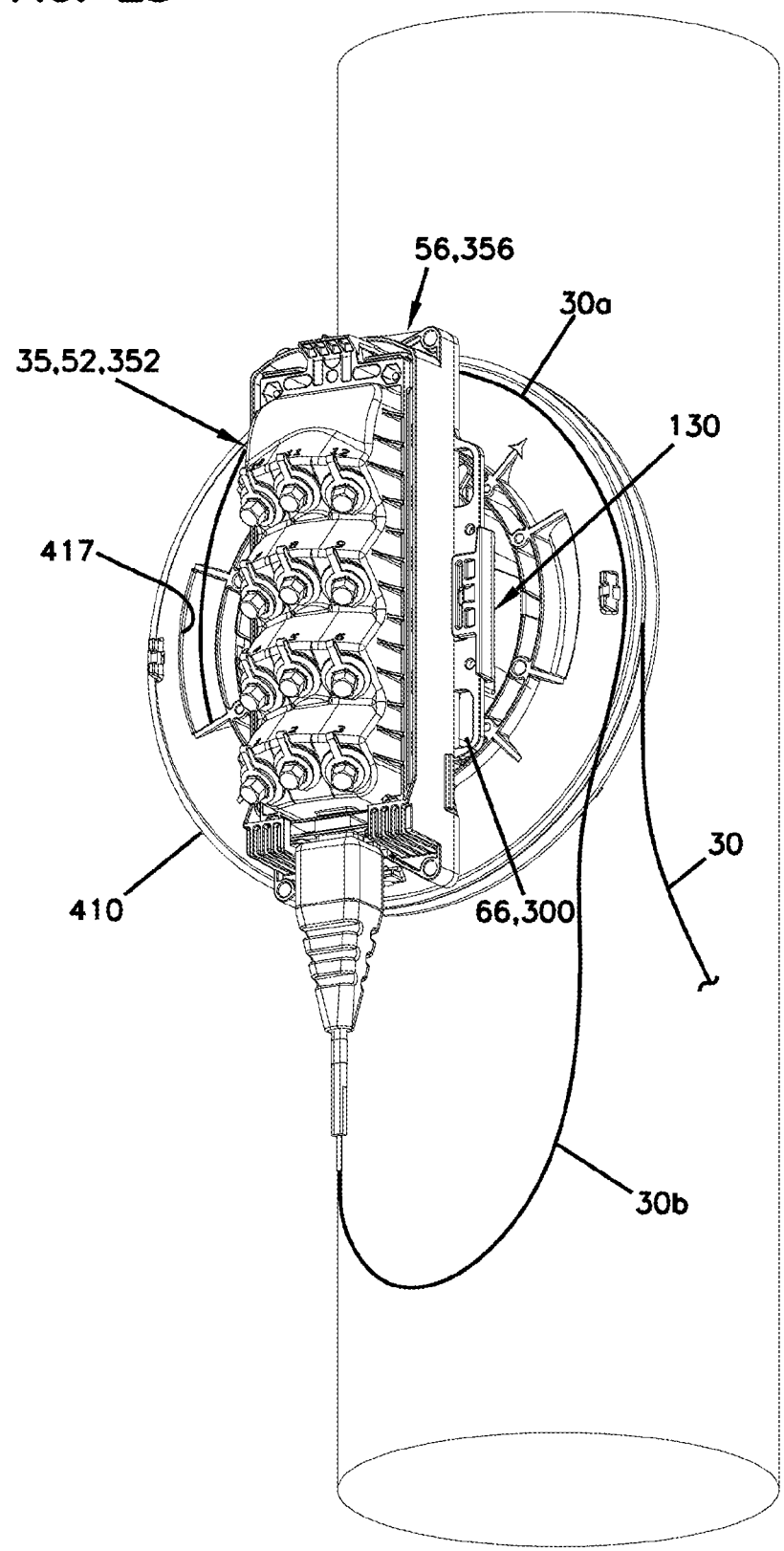
FIG. 28 illustrates the terminal and terminal mounting bracket mounted to the slack storage bracket of FIG. 27.

FIGS. 26-28 show the slack management spool 410 utilized with the slack storage bracket 54 and terminal mounting bracket 56, 356 described above. A predetermined length of the distribution cable 30 was pre-cabled around the drum 415 of the management spool 410 when the distribution cable 30 prior to deployment (e.g., when the cable 30 was packaged). In FIG. 26, the distribution cable 30 has been paid out from the disposable spool 402 (FIG. 19) and the slack management spool 410 has been disconnected from the disposable spool 402.

If needed to reach the installation site (e.g., a pole 310), some of the predetermined length may have been paid out from the slack management spool 410. For example, a user deploys the cable 30 from the slack management spool 410 by pulling the cable 30 relative to the slack management spool 410 (or rotating the spool 410 while holding the cable stationary). The slack management spool 410 stores remaining slack length of the distribution cable 30. The terminal 35, 52, 352 is disconnected from the slack management spool 410 (or was previously disconnected from the disposable spool 402).

As shown in FIG. 27, the slack management spool 410 is mounted to the slack storage structure 110 of the slack storage bracket 54. In certain implementations, the central aperture 413 of the slack management spool 410 is sized to fit around the slack storage structure 110. The tabs 132 may aid in retaining the slack management spool 410 on the slack storage structure 110. In some examples, the slack management spool 410 hangs loosely on the slack storage structure 110. In other examples, the slack management spool 410 latches, friction-fits, or otherwise secures to the slack storage structure 110 in a manner that inhibits removal.

In certain examples, a portion 30a of the cable 30 towards the second axial end extends through a window 417 in the slack management spool 410 and is coiled in one or more loops that can be attached (e.g., via cable ties) to the slack management spool 410. For example, the coil 30a can be attached to an exterior side of the first flange 412 or the second flange 414 of the slack management spool 410. A segment 30b of the distribution cable 30 extends from the coil 30a to the terminal 35, 52, 352. In certain examples, all or part of the coiled portion 30a can be detached from the slack management spool 410 to increase the length of the segment 30b, thereby providing greater maneuverability of the terminal 35, 52, 352 relative to the slack management spool 410. In some examples, the coiled portion 30a can be detached prior to mounting the slack management spool 410 to the bracket 54. In other examples, the coiled portion 30a can be detached after mounting the slack management spool 410 to the bracket 54.

As shown in FIG. 28, the terminal 35, 52, 352 is mounted to the mounting structure 130 of the bracket 54 as described above. In some examples, the terminal 35, 52, 352 is slid into a channel 139 defined by the mounting structure 130 from above the mounting structure 130. When attached, the terminal 35, 52, 352 inhibits removal of the slack management spool 410.

Figure 29:
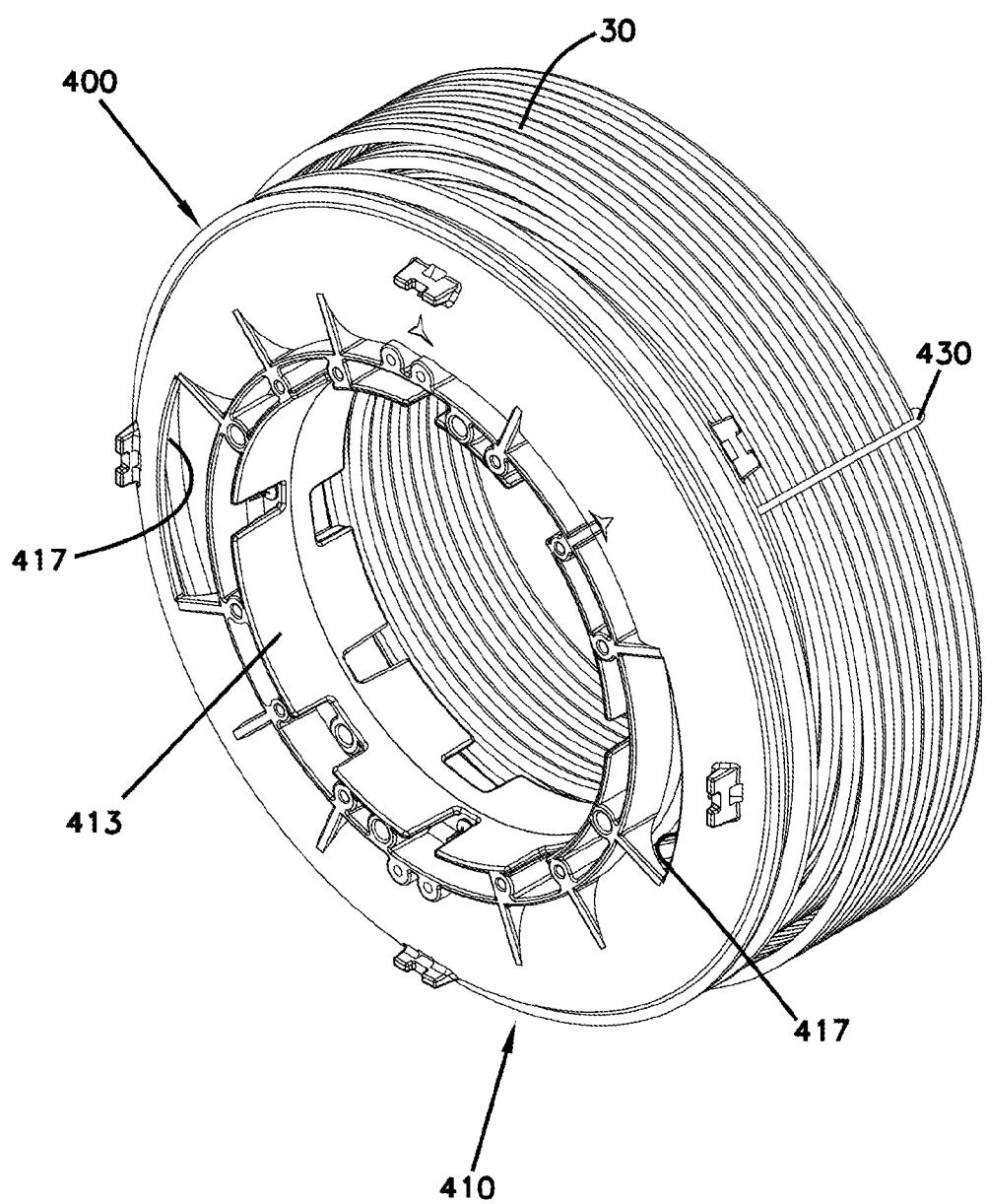
FIG. 29 is a perspective view of a coil of cable mounted to a slack management spool in accordance with some of the principles of the present disclosure.

FIG. 29 illustrates another example packaging and deployment system 400" including a coil of the distribution cable 30 attached directly to the slack management spool 410. In situations where the length of the distribution cable 30 to be deployed is sufficiently short, a majority of the distribution cable 30 can be coiled instead of wound onto a disposable spool (e.g., disposable spool 402). The remainder of the distribution cable 30 is held by the slack management spool 410. Bands 430, cable ties, or other securement structures bound the cable coil 30 prior to deployment (e.g., during shipping). In certain implementations, one or both flanges 412, 414 of the slack management spool 410 define apertures through which the bands 430 can loop to secure the cable coil to the spool 410. In certain implementations, a portion of the cable 30 can extend through a window 417 of the spool 410 and loop at the opposite spool flange 412, 414 from the cable coil 30. The one or more loops can be secured to the spool 410 using cable ties or other fasteners. In certain implementations, a terminal 35, 52, 352 can be secured to the slack management spool 410 as shown above in FIG. 19.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed:

1. A slack storage system comprising:
    a slack storage bracket including a slack storage structure dimensioned as a bend radius limiter, the slack storage bracket also including first and second sleeved arrangements extending outwardly from opposite sides of the slack storage structure, each of the first and second sleeved arrangements defining a channel facing the other of the first and second sleeved arrangements, each of the first and second sleeved arrangements including a protruding tab that extends into the respective channel; and
    a terminal coupled to the slack storage bracket by the first and second sleeved arrangements, the terminal including a housing carrying an input and a plurality of outputs.

2. The slack storage system of claim 1, wherein the first and second sleeved arrangements of the slack storage bracket have ramped surfaces so that the channels of the first and second sleeved arrangements can receive a structure from only one end of the sleeved arrangements.

3. The slack storage system of claim 2, wherein the terminal is a multi-service terminal mounted to the first and second sleeved arrangements of the slack storage bracket, the multi-service terminal including a plurality of ruggedized ports.

4. The slack storage system of claim 3, wherein the multi-service terminal includes rails that each define at least one aperture for receiving the protruding tab of one of the first and second sleeved arrangements.

5. The slack storage system of claim 3, wherein the ruggedized ports of the multi-service terminal terminate first axial ends of a cable that is partially stored by the slack management spool.

6. The slack storage system of claim 3, further comprising a terminal mounting bracket to which the multi-service terminal is mounted, the terminal mounting bracket including rails that each define at least one aperture for receiving the protruding tab of one of the first and second sleeved arrangements.

7. The slack storage system of claim 6, wherein the terminal mounting bracket includes outwardly facing latch arms that snap-fit to an interior of the multi-service terminal.

8. The slack storage system of claim 6, wherein the terminal mounting bracket includes inwardly facing latch arms that snap-fit over an exterior of the multi-service terminal.

9. The slack storage system of claim 1, further comprising a terminal mounting bracket to which the terminal is coupled, the terminal mounting bracket including rails that each define at least one aperture for receiving the protruding tab of one of the first and second sleeved arrangements.

10. The slack storage system of claim 9, wherein the terminal is mounted directly to the terminal mounting bracket.

11. The slack storage system of claim 9, further comprising a terminal adapter to which the terminal is mounted, the terminal adapter being mounted to the terminal mounting bracket.

12. The slack storage system of claim 1, wherein the terminal is mounted directly to the slack storage bracket, the terminal including rails that each define at least one aperture for receiving the protruding tab of one of the first and second sleeved arrangements.

13. The slack storage system of claim 1, further comprising
a terminal adapter to which the terminal is mounted, the terminal adapter including rails that each define at least one aperture for receiving the protruding tab of one of the first and second sleeved arrangements.

14. The slack storage system of claim 1, wherein the slack storage bracket has a front and a rear, the rear defining a mounting surface configured to mount at an installation site, the slack storage structure extending forwardly of the mounting surface.

15. The slack storage system of claim 1, wherein a slack management spool defining a central aperture is sized to mount over the slack storage structure of the slack storage bracket, the slack management spool including flexible flanges that cooperate to define a slot that is narrower than a width of the cable.

16. The slack storage system of claim 15, wherein the slack management spool includes teeth extending radially into the central aperture from an inner surface of the slack management spool that bounds the central aperture.

17. The slack storage system of claim 16, wherein the mounting surface of the slack storage bracket includes a catch arrangement defining a recess sized to receive one of the teeth of the slack management spool.

18. The slack storage system of claim 1, wherein the terminal is an indexing terminal.

19. The slack storage system of claim 1, wherein the terminal is a multi-service terminal.

20. The slack storage system of claim 1, wherein the slack storage bracket is configured to mount to one of a pole, a pedestal, a hand-hole, and an aerial strand.

* * * * *